(12) United States Patent
Seghers

(10) Patent No.: US 9,884,301 B2
(45) Date of Patent: Feb. 6, 2018

(54) MIXING SYSTEM FOR MIXING SOIL WITH AN ADDITIVE IN A BATCH MODE

(71) Applicant: ASENCO NV, Bazel (BE)

(72) Inventor: Willem Seghers, Bazel (BE)

(73) Assignee: ASENCO NV, Bazel (BE)

( * ) Notice: Subject to any disclaimer, the term of this patent is extended or adjusted under 35 U.S.C. 154(b) by 0 days.

(21) Appl. No.: 15/123,318

(22) PCT Filed: Mar. 3, 2015

(86) PCT No.: PCT/EP2015/054452
§ 371 (c)(1),
(2) Date: Sep. 2, 2016

(87) PCT Pub. No.: WO2015/132274
PCT Pub. Date: Sep. 11, 2015

(65) Prior Publication Data
US 2017/0072375 A1    Mar. 16, 2017

(30) Foreign Application Priority Data

Mar. 3, 2014   (BE) .................................. 2014/0144

(51) Int. Cl.
*B01F 13/00* (2006.01)
*B01F 15/02* (2006.01)
(Continued)

(52) U.S. Cl.
CPC ...... *B01F 15/00961* (2013.01); *B01F 13/004* (2013.01); *B01F 13/0038* (2013.01);
(Continued)

(58) Field of Classification Search
CPC ........... B01F 15/00961; B01F 15/0024; B01F 13/1011; B01F 15/00227; B01F 15/00194;
(Continued)

(56) References Cited

U.S. PATENT DOCUMENTS 4,712,919 A * 12/1987 Bouldin ..................... B01F 5/26
366/133
4,792,237 A * 12/1988 Hara ........................ B01F 7/166
175/19
(Continued)

FOREIGN PATENT DOCUMENTS

DE   19542031 A1 *  7/1996   ............. E01B 2/006
EP      1387009 A2    2/2004
(Continued)

OTHER PUBLICATIONS

Belgium Search Report for corresponding Belgium Application No. 2014/0144, Nov. 28, 2014.
(Continued)

*Primary Examiner* — Charles Cooley
(74) *Attorney, Agent, or Firm* — Workman Nydegger

(57) ABSTRACT

A mixing system for mixing ground or soil with an additive in a batch mode, the mixing system comprising: a moveable mixing device for mixing the ground with an additive, and moving mechanism, such as a moveable arm; a cargo body positioning area for receiving a cargo body; the cargo body positioning area and the moving mechanism being configured in position such that the mixing device can be positioned in the ground through an upper open side of the cargo body; the mixing system furthermore comprising information obtaining system for automated obtaining information regarding the load of the cargo body for allowing the mixing system to mix the ground with the additive, taking into account said information.

20 Claims, 11 Drawing Sheets

(51) Int. Cl.
    *B01F 15/00*     (2006.01)
    *B28C 5/12*     (2006.01)
    *B28C 5/42*     (2006.01)
    *E02D 3/12*     (2006.01)
    *E01C 19/02*     (2006.01)
    *E01C 19/47*     (2006.01)
    *B01F 13/10*     (2006.01)

(52) U.S. Cl.
    CPC ...... *B01F 13/1011* (2013.01); *B01F 15/0024* (2013.01); *B01F 15/00194* (2013.01); *B01F 15/00227* (2013.01); *B28C 5/1215* (2013.01); *B28C 5/422* (2013.01); *B28C 5/4282* (2013.01); *E01C 19/02* (2013.01); *E01C 19/025* (2013.01); *E01C 19/47* (2013.01); *E02D 3/12* (2013.01); *B01F 2013/1083* (2013.01); *B01F 2013/1086* (2013.01); *B01F 2215/0047* (2013.01)

(58) Field of Classification Search
    CPC ............... B01F 13/004; B01F 13/0038; B01F 2215/0047; B01F 2013/1086; B01F 2013/1083; B28C 5/422; B28C 5/4282; B28C 5/1215; E02D 3/12; E01C 19/02; E01C 19/025; E01C 19/47
    See application file for complete search history.

(56) References Cited

U.S. PATENT DOCUMENTS

| | | | | |
|---|---|---|---|---|
| 5,005,980 A | * | 4/1991 | Zimmerman | B01F 7/00925 241/101.8 |
| 5,491,914 A | * | 2/1996 | Negishi | E01C 21/00 37/403 |
| 5,631,160 A | * | 5/1997 | Bruso | B09C 1/00 405/128.5 |
| 5,639,182 A | * | 6/1997 | Paris | B09C 1/00 405/128.5 |
| 6,059,447 A | * | 5/2000 | Paris | B01F 13/00 366/271 |
| 6,299,380 B1 | | 10/2001 | Bracegirdle | |
| 6,837,609 B1 | * | 1/2005 | Kamoshida | E02D 3/126 241/34 |
| 7,393,133 B2 | * | 7/2008 | Acosta | A01G 9/1086 241/101.8 |
| 2005/0077058 A1 | * | 4/2005 | Chang | B01F 3/1221 172/1 |
| 2005/0111922 A1 | * | 5/2005 | Neff | A01B 79/02 405/263 |
| 2007/0014637 A1 | * | 1/2007 | Trevisani | E02D 3/12 405/258.1 |
| 2011/0311308 A1 | * | 12/2011 | Brouillette | B01F 3/12 404/75 |
| 2017/0072375 A1 | * | 3/2017 | Seghers | B01F 13/0038 |

FOREIGN PATENT DOCUMENTS

| | | | | |
|---|---|---|---|---|
| JP | 59109614 A | * | 6/1984 | ............... E02D 3/12 |
| JP | S6073750 U | | 5/1985 | |
| JP | 2002004262 A | | 1/2002 | |
| SU | 1320319 A1 | | 6/1987 | |
| WO | WO 2006136342 A1 | * | 12/2006 | ............ B01F 3/1221 |
| WO | WO 2015132274 A1 | * | 9/2015 | ........... B01F 11/0082 |

OTHER PUBLICATIONS

International Preliminary Report on Patentability for corresponding International PCT Application No. PCT/EP2015/054452, dated Jun. 10, 2016.
International Search Report for corresponding International PCT Application No. PCT/EP2015/054452, dated May 8, 2015.

* cited by examiner

MIXING SYSTEM FOR MIXING SOIL WITH AN ADDITIVE IN A BATCH MODE

FIELD OF THE INVENTION

The present invention generally relates to an efficient way to mix a load of bulk materials with other materials and with additives. More specifically, this invention relates to a mixing system, a mixing device, and a method to mix soil, other materials and additives in a controlled manner, e.g. in a dust-free manner.

BACKGROUND OF THE INVENTION

For industrial and construction purposes bulk materials of natural or artificial origin, are excavated or obtained from recycling. These bulk materials are typically loaded into "cargo bodies" or "loading bodies" or "loading platforms" or "open containers" on transport means to be delivered, with or without intermediate storage (and associated additional loads), after one or more treatments (for making them "suited") at a place of use in an industrial or civil engineering application.

An efficient and qualitative process should ensure maximum added value with guarantees for all stakeholders and with minimal adverse side effects, including for the environment. In particular, the $CO_2$ efficiency needs to be examined as well as maximum recycling to reduce dumping of waste materials as well as the exploitation of primary raw materials.

For construction purposes, for example as regards infrastructure works, delivery of construction materials (e.g. mixtures of mineral materials with lime and/or cement, foundation materials, materials for enveloping, backfill, embankment, drainage, etc.) at the right time, at the right place are contemplated.

Treatment of soil (making it suited by improving its properties) may be necessary for reasons of purification (sanitation), stabilization, consolidation or strengthening.

It is important that the quality of the works carried out by the contractor, especially for mentioned treatments, can be controlled and assured. It should be possible to comply with various requirements such as engineering and environmental requirements, and monitoring and control thereof should also be possible.

The 'making suited' of soil for engineering purposes is done mainly by intensive mixing of the soil with other soil and mineral flows and with additives. The additives mainly relate to cement, (quick) lime and other agents.

On-site stabilization works (in combination with earth works, embankments, foundations, etc.) for train paths, highways, main roads, etc. traditionally involve the spread out of cement and/or (quick) lime on the subsurface (consisting of soil and/or granulates, whether added or not), followed by an intensive mixing in layers of up to 60 cm in thickness, by means of milling, with or without addition of water. The processed whole is leveled and compacted so as to form a stable base for the superstructures to be realized. Excavation, transportation, replacement and disposal of waste soil are hardly required. Typically large quantities are involved in these applications.

In smaller-scale applications as well as in sewerage works, cohesive soil needs to be dug out, excavated, transported and, in order to make it suitable for reuse, collected in a separate area, spread and mixed with additives, scraped and again put on stock to be reloaded and transported back eventually as small loads to the construction site for use as a building material in foundations, envelops, backfilling. Quality control is almost impossible in these circumstances because of the heterogeneous nature of the underground, the moisture and the composition, the uncertainty of the precise quantity of applied milled additives. Often large displacements are required, which also implies logistical problems. A separate area is needed that is suitable for the mentioned intensive activities of unloading, spreading, milling, stocking up, loading, transportation, etc.

A solution for improving excavated soil in smaller scale projects would be the treatment of the soil, at the location of the excavation. However, this is time-consuming if done by means of the excavator as little or no other work can be performed during this soil improvement. Furthermore, in case of local treatment, near to the location of the excavation, the various machines needed here for are often standing in the way. Moreover, the activity of improving the soil may give rise to dust, which is disturbing and harmful for humans and for the environment.

Thus, there remains a need for an efficient system, and an efficient method for the improvement (making suited) of excavated soil.

SUMMARY OF THE INVENTION

It is an object of the present invention to provide an efficient system and method for the treatment of soil.

In particular, it is an object of the present invention to provide an efficient system and method for mixing a load of soil, present in a cargo body, with one or more additives, e.g. in terms of the time required for mixing (to obtain a sufficiently homogeneous mixture), and/or in terms of the amount of additives, and/or in terms of homogenity of the mixture, and/or in terms of desired properties of the mixture (e.g. humity, compactibility), etc.

It is an advantage of certain embodiments of the present invention that a mixing station is provided, that is capable of efficiently mixing a load of soil, present in a cargo body, with a suitable amount of additives, in an efficient manner.

It is an advantage of the present invention that excavated soil can be made suitable for construction applications.

It is an advantage of particular embodiments of the present invention that soil treatment can take place during transportation. This has inter alia the advantage that the soil does not need to be transported to a specific separate processing site, so that the soil treatment can be achieved in a transport-efficient way.

It is an advantage of embodiments of the present invention that no additional intermediate operations with machines are needed. It is an advantage that the methods according to embodiments of the present invention are $CO_2$ efficient.

It is an advantage of at least some embodiments of the present invention that it allows a detailed control of the transport, optionally with tracking of the location, place or route and with tracking of the amount or mass of displaced soil. This allows for example control against illegal dumping, for example by tracking the opening/closing of the cargo space or by tracking changes of the loaded mass. It is thus an advantage of embodiments of the present invention that it can contribute to a better ecology.

It is an advantage of at least some embodiments of the present invention that improvement agents which are added to the soil for improving it, can be added in such a way that the environment is not exposed to dust formation, thus reducing health hazards and damage (due to the aggressiveness of cement and (quick) lime, even in low-dust densities).

It is an advantage of at least some embodiments, that a limited amount of soil can be treated intensely under completely controlled conditions. It is therefore an advantage that the treatment is of high quality.

The above-mentioned objective is achieved by a mixing system and/or a mixing station and/or a mixing device and/or a method according to the present invention.

According to a first aspect, the present invention provides a mixing system, e.g. mixing station, for mixing soil with an additive in a batch mode, the mixing system comprising: a moveable mixing device for mixing the soil with an additive, and means, e.g. a moveable arm, for moving said mixing device; a cargo body positioning area for receiving a cargo body containing a load of soil; the cargo body positioning area and the means for moving the mixing device being configured in position such that the mixing device can be positioned, e.g. lowered, in the soil through an upper open side of the cargo body in said cargo body for mixing the soil with the additive; the mixing system furthermore comprising an information obtaining means for, when the cargo body containing the load of soil is positioned in the cargo body positioning area, automated obtaining information regarding at least one characteristic of the load of the cargo body so as to allow the mixing system to mix the soil with the additive, taking into account said information regarding at least one characteristic of the load of the cargo body.

Where in embodiments of the present invention reference is made to a batch mode, reference is made to a mode wherein a specific amount of soil is handled in a cargo body. The latter may be a fixed amount of soil which is static in the cargo body and whereby the cargo body is moved to the cargo body positioning area, according to preferred embodiments. In other embodiments, the batch mode may correspond with a mode whereby the soil is transported, e.g. via a conveyor belt, through a cargo body, such that at each moment in time a specific—controllable—amount of soil is at the processing area in the cargo body. The cargo body then may be fixed at the cargo body positioning area and the soil may be transported through the cargo body.

It is noted that the additive can be added to the cargo body before being placed in position to be mixed, or that the cargo body only contains soil, in which case an appropriate amount of additive is (manually or automatically) added after the cargo body is put in position.

It is an advantage that the mixing system contains a cargo body positioning area, because in this way the relative position of the cargo body (when present) and the means for moving the mixing device are precisely known. This allows automated movements of the mixing device inside said cargo body. It also allows one or more sensors, e.g. a weighing sensor, or an RFID reader, or a barcode scanner, etc. to be positioned at a suitable location with respect to the envisioned cargo body position.

It is an advantage that the cargo positioning means and the means for moving the mixing device can be configured with respect to each other.

It is an advantage of such mixing system that information about the load (e.g. volume, weight, humidity, compactibility, electrical resistance, etc.) can be obtained (e.g. retrieved) from the cargo body located in the cargo body positioning area, and is provided (e.g. transmitted) to the mixing system (e.g. to a control unit thereof). This provides relevant information to e.g. an operator or to an automated control unit, to enable appropriate mixing of the ground (or soil) and at least one additive. The at least one additive may for example be lime or quick lime, and/or water, and/or cement, and/or other mineral materials, etc.

It is an advantage of mixing the soil in a batch process, i.e. in specific amounts, rather than mixing an unspecified amount spread over an open area at a building site or elsewhere, because it allows the specific load with its particular characteristics to be efficiently mixed with a specific amount of additives in a specific manner corresponding to the particular characteristics of the load. In this way an optimal amount of additives can be added, rather than having to add an overdose, as is usually done in the prior art in order to reach the required specifications.

It is an advantage that the mixing actually occurs inside the cargo body rather than for example in a dedicated mixing container, because in this way unloading and reloading can be avoided. In this way time can be saved, and the amount of dust released during such loading/unloading actions can be reduced.

It is an advantage that information about the load can be taken into account during the actual mixing, because in this way efficient and/or optimal mixing can be obtained, for example in terms of the time required for mixing (to obtain a sufficiently homogeneous mixture), and/or in terms of the amount of additives, and/or in terms of uniformity of the mixture, and/or desired properties of the mixture (e.g. humity), etc. Such information is not available for example when mixing soil in an open area.

It is an advantage of providing a mixing device separate from the cargo body, because in this way a single mixing system or station can be used for a plurality of cargo bodies, and the cost of the individual cargo bodies can be reduced.

In an embodiment, the means for moving the moveable mixing device comprises a moveable arm, e.g. a hydraulic two-part articulated arm.

It is an advantage of using a moveable arm, in that such technology is very mature, very reliable, and allows very precise positioning and/or orientation of the mixing device. Furthermore, the arm can easily move the mixing device in any directions (e.g. in any of the length/width/depth direction of the cargo body).

It is an advantage of a moveable arm that it can be driven by a hydraulic system, and is thus capable of exerting high forces on the mixing device. This allows for example to actively push the mixing device inside the soil, and to move the mixing device back and forth through the soil.

In an embodiment, the means for moving the moveable mixing device comprises a roller bridge.

It is an advantage of using a roller bridge in that it allows easy positioning of the mixing device in a plane parallel to the ground, without rotating it (as opposed to a moveable arm). It is a further advantage of using a roller bridge that it requires only a limited additional height (typically less than 1.0 m).

In an embodiment, the mixing system further comprises a platform positioned at a platform height with respect to a ground level, the platform height being chosen such that an upper open side of the cargo body, when the cargo body is positioned at the ground level, is positioned below the platform height, whereby the means for moving the mixing device is mounted to, or positioned on the platform.

It is an advantage of embodiments according to the present invention that fast treatment of soil in a cargo body can be obtained without the need for removing/loading the soil in the cargo body. In other words, it is an advantage of embodiments of the present invention that mixing can be performed in the cargo body. It is an advantage of embodiments of the present invention that efficient soil treatment can be performed. The treatment can e.g. be performed in a time efficient manner.

It is an advantage of embodiments according to the present invention that, although mixing can be performed in the cargo body, it is not required to equip all cargo bodies used for ground treatment with an own mixing system, resulting in a reduction of the amount of machinery to be installed.

In an embodiment, the mixing system comprises platform supports for supporting the platform with respect to the ground level, wherein the platform supports are distanced with respect to each other such that a cargo body can be positioned fully or partially under the platform between the platform supports.

The platform may provide an opening (e.g. in a horizontal plane of the platform) for allowing the mixing device to pass to a cargo body directly under the platform.

It is an advantage of embodiments of the present invention that a compact setup for the mixing system can be obtained by allowing the cargo body to be positioned under the platform.

In an embodiment, the platform and the means for moving the mixing device are configured so as to allow mixing in a cargo body when the cargo body is positioned adjacent or aside the platform.

It is an advantage of embodiments of the present invention that these are not restricted to mixing directly below the platform, but that mixing of soil in a cargo body also can be performed next to the platform—but still at a level below the platform.

In an embodiment, the mixing system furthermore comprises a ramp or rampart or quay providing a transition between the ground level and an elevation, the platform being positioned on said elevation, said platform and said ramp or rampart or quay being configured such that mixing in a cargo body positioned at ground level aside the ramp or rampart or quay can be performed.

In an embodiment, the mixing system is moveable or transportable or displaceable, so that it can be moved or transported or displaced, for example as a single entity or as a small number of entities, to a position near a construction site.

It is an advantage of embodiments of the present invention that the mixing can be performed near the construction side, as this reduces the amount of displacements to be made.

It is an advantage of some embodiments of the present invention that mixing can be performed near the construction site and directly below the platform, resulting in the space required for mixing near the construction site being mainly defined by the size of the platform. The latter reduces the risk of obstruction at the construction site.

In an embodiment, the mixing system further comprises an additive supply means and a dosage device or metering device for dosing or metering at least one additive to be added to the soil in the cargo body.

It is an advantage of embodiments of the present invention that the additive can be added in a controlled manner.

It is an advantage of embodiment according to the present invention that addition of the additive can be done using the same system as is used for mixing, i.e. at the same position without a need for displacing the cargo body.

In an embodiment, the mixing system further comprises a local reservoir for feeding the additive supply means.

In an embodiment, the mixing system comprises a feeding tube for feeding the additive supply means from an external reservoir.

It is an advantage of embodiments of the present invention that an external (stationary or moveable) reservoir can be used allowing a large capacity of additives to be present for mixing.

In an embodiment, the mixing system further comprises a closure for shielding the environment from dust caused by the mixing in the cargo body.

It is an advantage of embodiments of the present invention that health risks can be reduced by shielding the environment from hazardous dust.

In an embodiment, the mixing device comprises one or more mixing wheel and/or one or more milling wheel and/or one or more axles and/or one or more clappers.

It is an advantage of embodiments of the present invention that a large number of different types of mixing devices can be used in the present system.

In an embodiment, the mixing device comprises axles containing cams, for performing, inter alia, a sieving operation.

In an embodiment, the mixing device comprises a drive sprocket wheel and/or a hydraulic drive and/or a drive chain.

It is an advantage that the mixing device may be powered in a variety of ways, e.g. electrically or mechanically or hydraulically.

In an embodiment, the mixing system further comprises a sensor for receiving information regarding the load in the cargo body, for controlling the dosing device and/or the mixing device.

In an embodiment, the sensor is adapted for reading load information from a tag. The tag may be mounted on the cargo body, e.g. on an outside thereof, at a predefined position.

In an embodiment, the mixing system further comprises a weighing device positioned at ground level below or aside the platform, for obtaining a weight of the cargo body or its load.

It is an advantage of embodiments of the present invention that an accurate weight of the load can be obtained, reducing the risk of fraud.

In an embodiment, the system comprises a sensor for detecting a resistivity of the soil, or for detecting a humidity of the soil, or for detecting a compactibility of the soil, or a combination hereof.

According to a second aspect, the present invention provides a method for treatment of soil in a mixing system comprising a moveable mixing device, and means for moving said mixing device, and a cargo body positioning area for receiving a cargo body containing a load of soil, and information obtaining means for obtaining information about at least one characteristic of the load inside the cargo body, the method comprising the steps of: providing a cargo body containing a load of soil in the cargo body positioning area; obtaining information about at least one characteristic of the load using the information obtaining means; mixing the soil in the cargo body with an additive, based on the information obtained, and using the mixing device. The information obtaining means may be a system whereby information is wirelessly transmitted.

In an embodiment, providing a cargo body containing a load of soil comprises loading a load of soil into a cargo body, and transporting said cargo body to the mixing system or mixing station.

In an embodiment, the mixing system further comprises a platform positioned at a predefined height above the ground, the means for moving the mixing device being mounted to or positioned on said platform, and whereby providing the cargo body further comprises positioning the cargo body on the cargo body positioning area located underneath, e.g. directly under or adjacent or aside the platform.

The method may further comprise the step of transporting the cargo body containing the soil mixed with the additive to a construction site.

The method may further comprise the step of lowering the mixing device in the cargo body directly below or aside the platform.

In an embodiment, the mixing system further comprises a control unit, and the method further comprises the step of: reading in, in the control unit of the mixing system, information regarding the load of the cargo body, and determining based on the obtained information, information regarding the additive to be added or the mixing to be performed.

In an embodiment, reading in information comprises one or more of the following: reading in information from a tag on the cargo body, reading in information from a weighing device of the mixing system, reading in information of a sensor for detecting a ground resistivity, reading in information of a sensor for detecting a humidity of the soil or a compactibility of the soil.

According to a third aspect, the present invention also relates to a mixing system for mixing soil with an additive, the mixing system comprising a mixing apparatus comprising a mixing chamber, at least one closure for closing or sealing the mixing device, wherein the mixing system is mountable on a cargo body, such that the mounted mixing device is moveable through the volume of the cargo body while the at least one closure keeps the cargo body closed or sealed.

Embodiments of the present invention make it possible to treat soil, and then to re-use it as a valuable building material, so that the use of primary construction materials such as pit sand and sea sand can be minimized. It is an advantage of embodiments of the present invention that the concept allows a strong reduction of $CO_2$ emission, inter alia because the amount of transport and intermediate operations can be limited. It is an advantage of embodiments of the present invention that soil and additives can be mixed without causing dust around the mixing device. In embodiments, the mixing device moves through the soil and the additive is added locally during the mixing. It is an advantage of embodiments of the present invention that a homogeneous mixing between the additive and the soil is realized. Due to the homogeneous distribution and the controlled mixing only a minimal amount of additive is necessary in order to have at least a predefined (e.g. minimum) concentration of additive throughout the mixture. It is an advantage of embodiments of the present invention that different types of soil can be thoroughly mixed, optionally with addition of various additives. It is an advantage of embodiments of the present invention that the required amount of additives may be reduced by promoting evaporation and ventilation.

The mixing device may further comprise a reservoir for at least one additive, and a dosage device or metering device wherein the mixing system is mountable on a cargo body, so that the additive can be added in a dosed manner into the mixing chamber via the dosage or metering device, while the at least one closure keeps the upper side of the cargo body closed.

The at least one closure may comprise a first closure that connects to a first side of the mixing apparatus through a first connection mechanism, and may include a second closure that connects to a second side of the mixing device via a second connection mechanism, so that during the movement of the mixing device the container remains closed. It is an advantage of embodiments of the present invention that a good closure or sealing can be obtained, so that the risk of contamination of the environment can be reduced or minimized. Moreover, by the use of a good closure, the mixing can take place in a weather independent manner.

The mixing system may be mobile, and the mixing system may be further adapted to mix soil and additive(s) during transport. It is an advantage of embodiments of the present invention that the improvement of the soil can take place during transport so that there is no longer a need for a separate storage and processing site.

The mixing chamber may contain one or more mixing wheels, milling wheels and/or axles and/or clappers. It is an advantage of embodiments of the present invention that the soil and additive(s) can be mixed with each other by means of a mixing wheel. More generally, the mixing chamber may comprise one or more mixing elements, such as one or more mixing wheels, milling wheels, axles, clappers, etc.

The system may be adapted to turn over the soil in order to aerate it, and to allow it to dry.

The mixing device may comprise shafts, with for example cams mounted thereon, inter alia for a sieve treatment or a fracturing or crushing operation during the transport. It is an advantage of embodiments of the present invention that large lumps/stones can be sieved or broken.

The mixing device may include a drive sprocket wheel and/or a hydraulic drive and/or drive chains. It is an advantage of embodiments of the present invention that the mixing device can be moved over or in the cargo body by means of a sprocket wheel. It is an advantage of embodiments of the present invention that the mixing wheel and/or the dosage device and/or the shafts are driven by means of a drive sprocket wheel, or hydraulically, or with chains.

The mixing system may comprise a sensor that can measure the resistance of the ground, e.g. electrical resistance. It is an advantage of embodiments of the present invention that the resistance of the ground can be measured. This makes it possible to protect the mixing device from, for example large stones, by stopping the operation or slowing it down when the sensor indicates that the resistance is too large.

The mixing system may include a sensor for measuring the humidity of the ground. It is an advantage of embodiments of the present invention that the humidity of the ground can be measured since this makes it possible to calculate how much moisture must be added or removed in order to achieve a certain desired degree of humidity of the ground. It is an advantage that this characteristic may be regularly measured during the process, and therefore that the required amount of additives may be dynamically adjusted.

The mixing system may include a sensor or a test method for measuring the compactibility of the soil. It is an advantage of embodiments of the present invention that the compactibility of the soil can be measured since this has an influence on the required quantity of additive(s). In other words, by knowing the compactibility, the required amount of additive(s) can be determined or better estimated. It is an advantage that this characteristic can be regularly measured during the mixing process and, consequently, that the required amount of additive(s) and/or water can be adjusted dynamically.

According to a fourth aspect, the present invention also relates to a transport means for transporting and mixing of soil, the transport means comprising a mixing system as described above, mounted on or in a cargo body. The transport means may be a truck or a moving chassis, whether driven or not. It is an advantage of embodiments of the present invention that the soil and additive(s) can be mixed during transport, for example, on the building site. This allows to minimize transportation (per axis), both inside and outside the building site. This is beneficial for transport costs, $CO_2$ emissions and congestion on the roads. The $CO_2$ emissions are not only reduced by the limited transport but also by the fact that no intermediate operations are required anymore, such as the spreading, putting on stock, the loading of the transport at the interim storage site, etc. For example, in the case of infrastructure works, it is important that the excavated soil can be treated locally, and is reused. It is an advantage of embodiments that the mixing can be performed during the driving. In this way it is possible to pick up raw unprocessed soil, to drive to the destination while in the meantime treating the soil, and to finally deliver the treated soil at the destination. It is an advantage of embodiments of the present invention that materials can be maximally recycled, and that this can take place at or near the construction site.

The transport means may also include a weighing system for weighing the contents of the cargo body and the reservoir. It is an advantage of embodiments of the present invention that the total amount of soil can be weighted so that the required amount of additive(s) can be estimated. It is an advantage of embodiments of the present invention that the required amount of additive(s) can be determined as correctly as possible. As a result, a waste of additives is avoided. It is an advantage of embodiments of the present invention that use is made of limited amounts of soil in accordance with the available volume of the cargo body. This makes it possible to vary the amount of additive depending on the quality of the soil that is loaded. Also, the amount and/or the type of additives may be changed according to the application of the fraction to be made suited. A given fraction can for instance be used as foundation or as a enveloping or as (back)filling, and depending on the application the type of additive and/or the optimal mixing ratio may optionally be different. It is an advantage of embodiments of the present invention that control mechanisms can be incorporated related to the total quantity of received and delivered soil.

The transport means may also comprise a position sensor. The position sensor may be a GPS system. The position sensor may be coupled to a processor for correlating the position of the soil to other data relating to the soil. It is an advantage of embodiments of the present invention that a database can be constructed containing the origin, the quantity, the post-processing, and the destination of successive batches of soil. It is an advantage of embodiments of the present invention that such a database may be used to control the whole process and to prevent abuses such as illegal dumping.

The transport means may be equipped with an aeration system, wherein the aeration system can aerate the contents of the cargo body and optionally can heat air with residual heat of an engine, for example of the transport means. It is an advantage of embodiments of the present invention that the soil can be aerated, and that the ventilation air can be heated (dried) with residual heat from an engine. This facilitates accelerated drying of the soil.

The transport means may comprise a storage medium and a processor, wherein the processor may store measurement data from the various sensors in the storage medium and/or wherein the transport means comprises a transmission unit for transmitting measurement data from the different sensors to an external storage medium or processing medium. It is an advantage of embodiments of the present invention that the measurement data of the sensors can be saved since this improves the traceability of the various soil fractions.

According to a fifth aspect, the present invention also relates to a method for treating the soil, the method comprising, loading the soil in a cargo body; closing or sealing the cargo body with at least one closure; mixing the soil by the back and forth movement of the mixing device through the soil, while the cargo body remains closed or sealed for dust by the at least one closure; unloading the mixed soil. It is an advantage of embodiments of the present invention that the mixing can occur in a dust-free manner.

The method may further comprise that at least one additive is kept in a reservoir of the mixing device prior to being added in a metered or dosed manner to the soil by means of a metering unit or dosage device, whereafter the soil and the additive are mixed in the mixing chamber of the mixing device. During the mixing, the cargo body may be transported. It is an advantage of embodiments of the present invention that the mixing can be performed while driving.

The method may additionally comprise the step of determining the position of the cargo body and/or weighing of the cargo body, and/or performing additional measurements. It is an advantage of embodiments of the present invention that traceability of the soil is possible. The origin, the processing, and the destination may be registered. It is an advantage of embodiments of the present invention that the mixing process may be adjusted during the mixing, on the basis of various measurements (e.g. using a humidity sensor).

The method may furthermore comprise aeration of the soil.

The method may furthermore comprise further mixing with a further additive.

The method may furthermore comprise sieving and breaking of the treated product.

It is an advantage of embodiments of the present invention that in the execution of sewerage works in urban environments, there is no or less need for intermediate areas for storage and processing. This is certainly an advantage considering that areas that are suitable for this purpose are scarce. In addition, this also reduces the nuisance to the environment.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
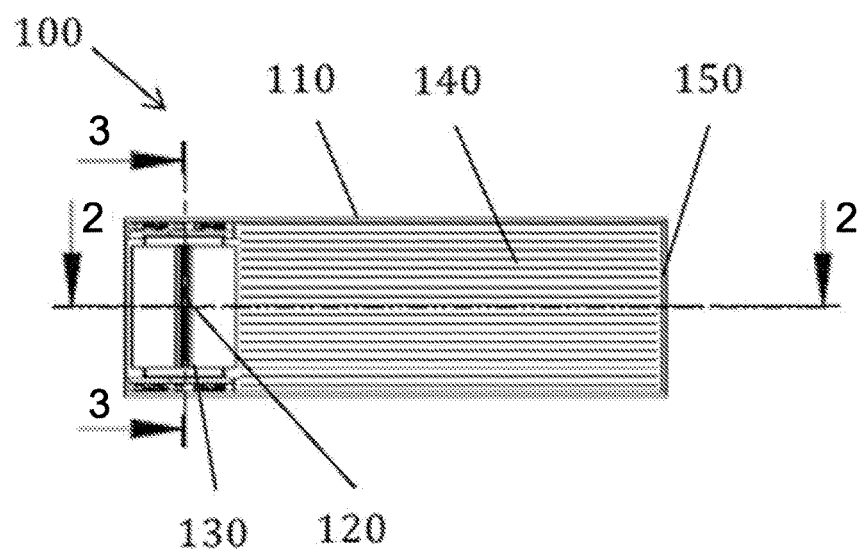
FIG. 1 illustrates a top view of a cargo body or container on top of which a mixing device and a closure are mounted, according to an embodiment of the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to "cargo body", reference is made to a "loading body" or "loading platform" or "a container" or "a tank" or any form of closable space in which soil or another bulk material to be treated, can be stored. This may be a container, or a dump body, or a tipper body or an ejector body or a trailer body of a truck or a container mounted on a driving, floating or towed chassis, but it may also be a closable volume (e.g. a bucket) with which an excavator can be equipped.

In a first aspect, the present invention relates to a mixing system or mixing station 800 for mixing, in a batch process, soil with at least one additive. The mixing system for mixing soil with an additive in a batch mode comprises a moveable mixing device for mixing the soil with an additive and means for moving said mixing device, a cargo body positioning area for receiving a cargo body containing a load of soil. The cargo body positioning area and the means for moving the mixing device are being configured in position such that the mixing device can be positioned at least partly in the soil through an open side of the cargo body in said cargo body for mixing the soil with the additive. The mixing system furthermore comprising an information obtaining means for, when the cargo body containing the load of soil is positioned in the cargo body positioning area (801) automated obtaining information regarding at least one characteristic of the load of the cargo body so as to allow the mixing system to mix the soil with the additive, taking into account said information regarding at least one characteristic of the load of the cargo body.

Figure 8:
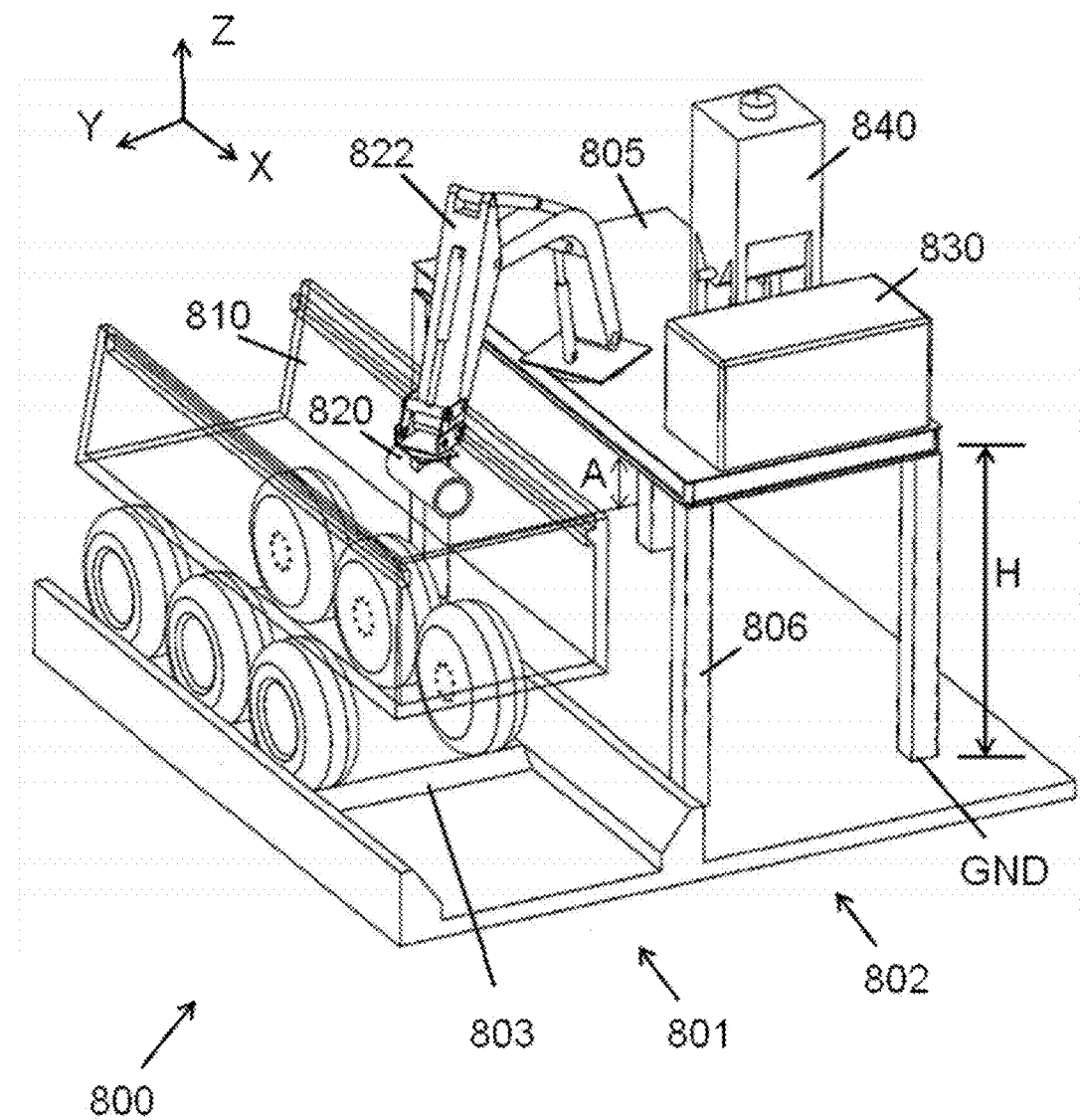
FIG. 8 shows in 3D perspective view, a mixing system or mixing station comprising a platform positioned at a predefined height above the ground, and a mixing device mounted on a movable arm, the arm being mounted to the platform, according to embodiments of the present invention. The platform may have a first, local reservoir for containing an additive such as lime or cement or water.

FIG. 8 shows a particular embodiment of such a mixing system 800, having a first zone 801, configured as a cargo body positioning area, and a second zone 802, also referred to as the control zone, comprising a moveable mixing device 820 and means 822 for moving the mixing device 820, and information obtaining means for obtaining at least information about one characteristic of the load in a cargo body 810 present in or on the cargo body positioning area 801. Optionally the information obtaining means may also obtain information about the cargo body itself, for example weight and/or dimensions thereof.

The first zone 801 is an area where a cargo body 810 can be parked, or temporarily positioned. The cargo body 810 shown in FIG. 8 has an open end, but preferably the cargo body is only open at the top. The cargo body shown in FIG. 8 is a trailer, but the invention is not limited thereto, and also works for other cargo bodies, for example fixedly attached to a truck. The first zone 801 may have means for guiding the cargo body into a predefined position, such as raised edges, and/or a limiter 803 for indicating a preferred stop position, but that is not essential. When present, it may be used by a control unit of the mixing system for deriving the position of the cargo body 810.

The cargo body positioning area 801 may also comprise a so called weighbridge, which may be less than 100 cm high, or less than 80 cm high, and typically has a first ramp to allow a vehicle to drive onto the weighbridge, and a second ramp to allow the vehicle to leave the weighbridge, without having to turn around or drive backwards, but that is not essential. When present, it would allow a control unit of the mixing system 800 to determine the total weight of the cargo body including a load of soil contained therein.

The mixing system 800 of FIG. 8 comprises a mixing device 820, schematically represented as a cylindrical device, but that is not essential for the present invention, and the mixing device 820 may have any suitable shape and size. What is important is that, when the mixing device 820 is lowered on or in the soil present in the cargo body, it can mix the soil present in the cargo body 810. Thereto the mixing device may have one or more mixing wheels 510 and/or one or more milling wheels and/or one or more axles and/or one or more clappers, or other suitable means for mixing the soil. In particular embodiments, the axles may contain cams, for, inter alia, a sieving operation. Another embodiment of a mixing device that could be used will be discussed in relation to FIGS. 1 to 5, although in these figures the mixing devices is described as being mounted to the cargo body, which is not the case in the embodiment of FIG. 8 to FIG. 13.

The mixing device 820 is to be positioned inside the cargo body for mixing the soil and one or more additives. This can be accomplished for example by means of a moveable arm 822, for example a hydraulic two-part articulated arm, and/or a roller bridge 821, or other means suitable for lowering the mixing device 820 into the cargo body, and/or for moving it back and forth in the longitudinal direction X and/or transverse direction Y of the cargo body 810.

The mixing device 820 may be powered or energized or drive in any suitable manner, for example, mechanically, electrically, hydraulically, pneumatically, or in any other way. The mixing device may comprises a drive sprocket wheel 320 and/or a hydraulic drive and/or a drive chain, or other driving means, and of course the mixing system 800 would provide such electrical, mechanical, pneumatic or hydraulic power, for example by corresponding powering means, known per se in the art. The powering means may be part of a power and control unit 830.

It is possible that an amount of additive, such as for example quick lime or cement, was already added on top of the ground, or was injected in the ground before arrival of the cargo body 810 at the cargo positioning area 801 of the mixing station 800, in which case the mixing device 820 would be used for mixing the materials already present in the cargo body 810, by lowering the mixing 820 into the cargo body, and by moving the mixing device 820 back and forth in the cargo body, as appropriate.

In an example, no additives would have to be added, and the mixing system 800 would only have to mix. For an efficient mixing process, however, it would be advantageous to know how long the mixing process has to continue, and/or how fast the mixing device 820 can be moved through the soil. This depends a.o. on the amount of soil present in the cargo body, and/or characteristics of said ground.

In another embodiment, despite soil and some additives already being present in the cargo body (e.g. quick lime), it may be desired to add some other additives, such as e.g. cement and/or water. To this end, it would be desirable to know or to measure some parameters, such as e.g. the humidity of the materials in the cargo body. The mixing station would then retrieve this information from the cargo body, for example read this information from an information carrier (such as an RF-ID tag), or to measure such parameters by using one or more sensors. Such one or more sensors may be inserted automatically, or manually in the soil on the cargo body. Alternatively one or more ground samples could be taken from the cargo body, and analyzed. A control unit of the mixing station 800 would then use this information to determine at least one amount of another additive, an amount of cement to be added and/or an amount of water to be added, and/or to determine parameters of the mixing process, such as e.g. speed of movement, rotation speed of axles, etc. A dosage unit or metering unit operatively connected to a cement reservoir and/or a water reservoir would then be operated, so that an appropriate amount of cement and/or water can be added via for example flexible hoses or via tube (not shown). A powering unit and control unit may then also operate a flexible arm 822 (or other movement means) for powering the mixing device, and for moving the mixing device through the ground in the cargo body.

According to an advantageous aspect of the present invention, at least some of this information (e.g. weight of the ground, type of ground, humidity, etc.) is read from an information carrier, e.g. from a tag, e.g. RFID-tag, present or mounted to the cargo body, or is obtained via one or more sensors. The sensors may be inserted in the ground by the same arm 822, or by a second arm (not shown) or by another lowering mechanism (for example a roller bridge), or could be inserted manually by an operator. In each case, information about the load present in the cargo body 810 is measured or read or sensed at the cargo positioning area, and transmitted to the second zone 802, for example to a control unit of the mixing system. The information obtained from the sensor or information carrier can then be used for controlling the dosing device and/or the mixing device 820. In a particular embodiment, the sensor may be adapted for reading load information from a tag. The tag may be mounted on an outer side of the cargo body 810, and may be programmed with relevant information at the site where the ground was loaded. But the mixing system 800 may also comprise one or more other sensors, such as for example a sensor for detecting an electrical resistivity of the soil, or for detecting a humidity of the soil, or for detecting a compactibility of the soil, or any combination hereof.

However, the advantages of the present invention are most appreciated when a cargo body containing only soil, but no additives, arrives at the mixing station 800, whereby a control unit of the mixing station measures or reads or senses information (e.g. weight, humidity, compressibility, etc.) about the soil present in the cargo body 810, and determines an appropriate amount of one or more additives to be added to make the ground suitable for particular construction purposes, and automatically or semi-automatically adds those additives to the ground, and the automatically or semi-automatically mixes the ground and additives. With semi-automatically is meant for example that a control unit prepares or performs some actions, but requires confirmation or some intervention from a human operator. To this end, the mixing system 800 may comprise an additive supply means and a dosage device or metering device for dosing or metering at least one additive to be added to the soil in the cargo body 810. The mixing system 800 may also comprise one or more local reservoirs 840 for feeding the additive supply means. The one or more local reservoirs may be adapted for holding one or more additives, such as for example, but not limited to: quick lime, cement and water. Alternatively, the additive supply means may also be fed via a feeding tube connected to an external reservoir, e.g. from a mobile reservoir (see FIG. 12). Rather than feeding the additive directly from such an external reservoir into the cargo body 810, it is advantageous to feed the additives into the local reservoir(s) 840 using the local dosage or metering device(s). One or more stationary or movable external reservoirs 852 may be used (see e.g. FIG. 9) for refilling the one or more local reservoirs 840, when they run empty.

The movements of the mixing device 820 in the cargo body may be controlled manually, for example by an operator controlling the movements of the hydraulic arm 822, or may be performed fully automated. It is advantageous in this case that information about the inner dimensions of the cargo body are known to the control unit of the mixing system. These dimensions may for example be manually entered by an operator, or could be present on the information tag mounted on the cargo body, or could be determined by sensors or cameras before the actual mixing takes place, or could be determined by sensors during the mixing. Once the dimensions of the cargo body 810 are known, the control unit of the mixing system can control the means 822 for moving the mixing device 820 such that it is moved substantially through the entire space defined by the cargo body.

In the embodiment of FIG. 8, the mixing device 820 is moved by a moveable arm 822, of the kind known per se in the art. The arm may be fixedly connected to a platform 805, which is positioned at a predefined height 'H' above the ground, or by a height 'A' higher than an upper side of envisioned cargo bodies, when present in the cargo positioning area 801. For example, in case the area 801 would comprise a weighbridge of 0.50 m height, and the envisioned cargo bodies 810 would have a height of 3.0 m, then the platform 805 would be located at a height of at least 351 cm. This offers the advantage that the additives can be easily transferred from the at least one reservoir 840 into the cargo body, and that the mixing device 820 can be easily lowered into the cargo body.

Figure 9:
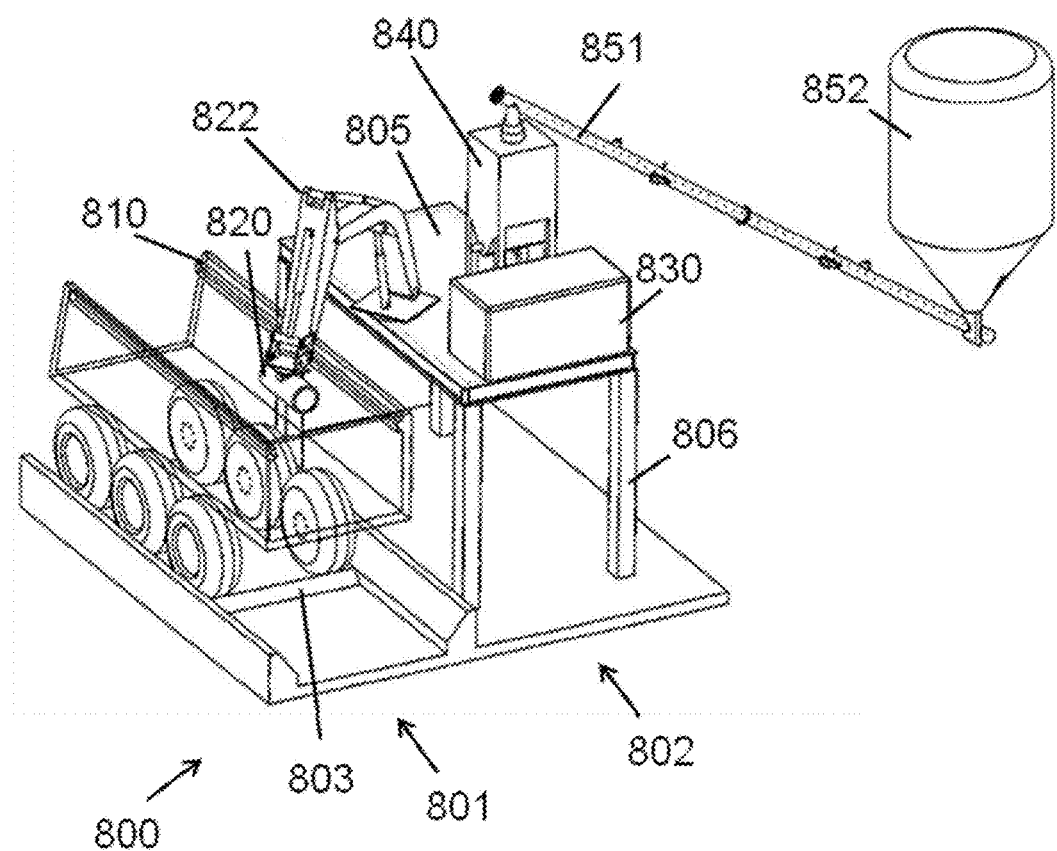
FIG. 9 shows the embodiment of FIG. 8, connected to a second reservoir and a feeding tube, according to embodiments of the present invention. The latter may be part of the mixing station, or not.

In a variant of the embodiment of FIG. 8 and FIG. 9, the mixing system 800 may comprise a ramp or rampart or quay providing a transition between the ground level GND and the platform 805, the platform 805 and said ramp or rampart or quay being configured such that mixing in a cargo body 810 positioned at ground level aside the rampart can be performed.

The platform could function as a quay wall, for allowing machinery with a moveable arm, for example with a gripper arm, to grip the mixing device 820, and to move it through the cargo body 820.

In the embodiments of FIG. 8 and FIG. 9, the platform 805 was located next to, or adjacent or aside the cargo body position area 801. However, embodiments of the present invention are not limited thereto, and other arrangements are possible.

Figure 10:
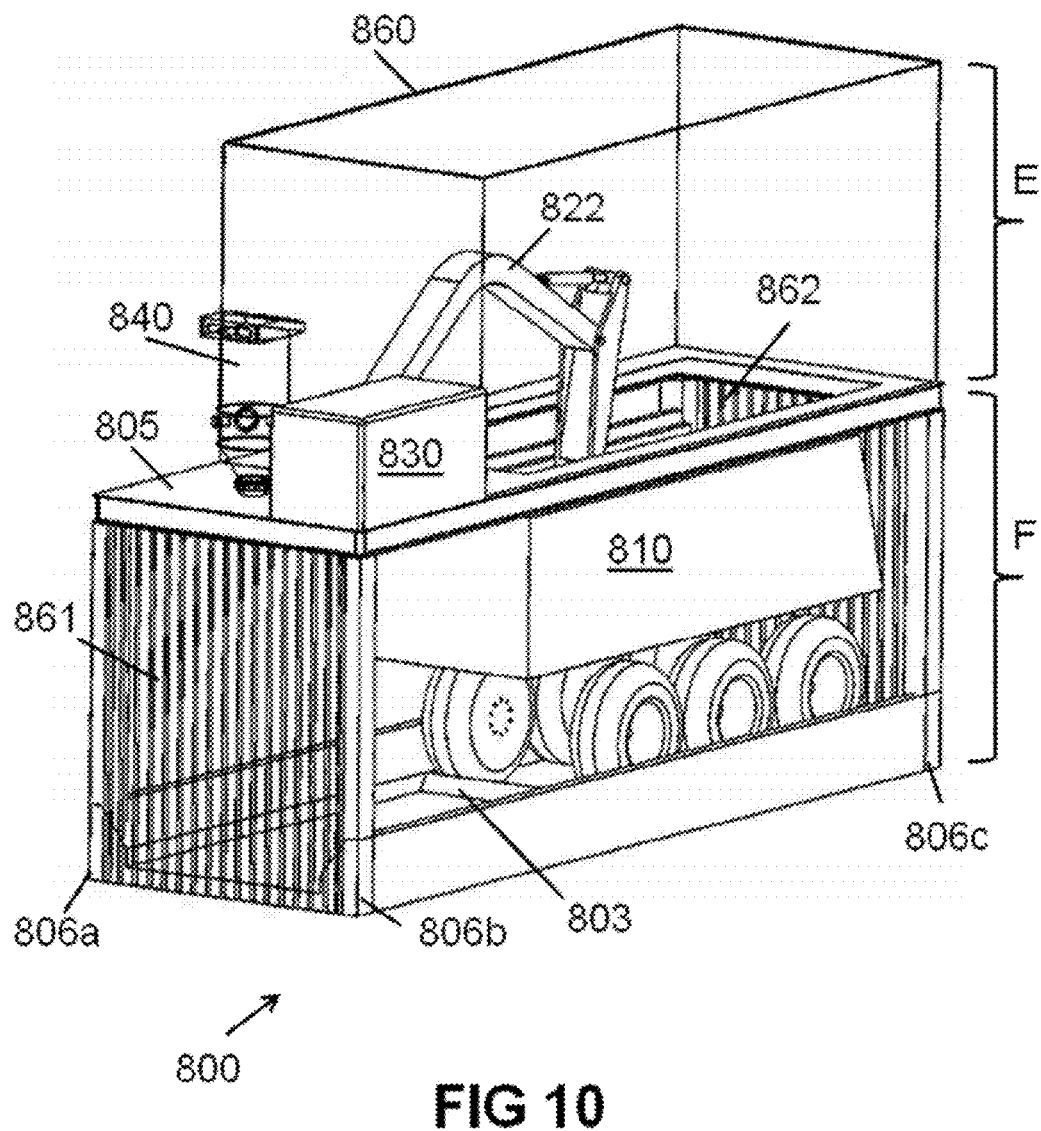
FIG. 10 shows another embodiment of a mixing system according to the present invention, whereby a cargo body can be positioned below the platform, and the movable arm can be lowered into the cargo body via an opening in the platform. The mixing system further comprises a top construction (shown transparent for illustrative purposes), and a front cover or front shield or front door or front screen or the like, and a back cover or back shield or back door or back screen or the like. A side wall next to the cargo body is also shown transparent for illustrative purposes.
Figure 11:
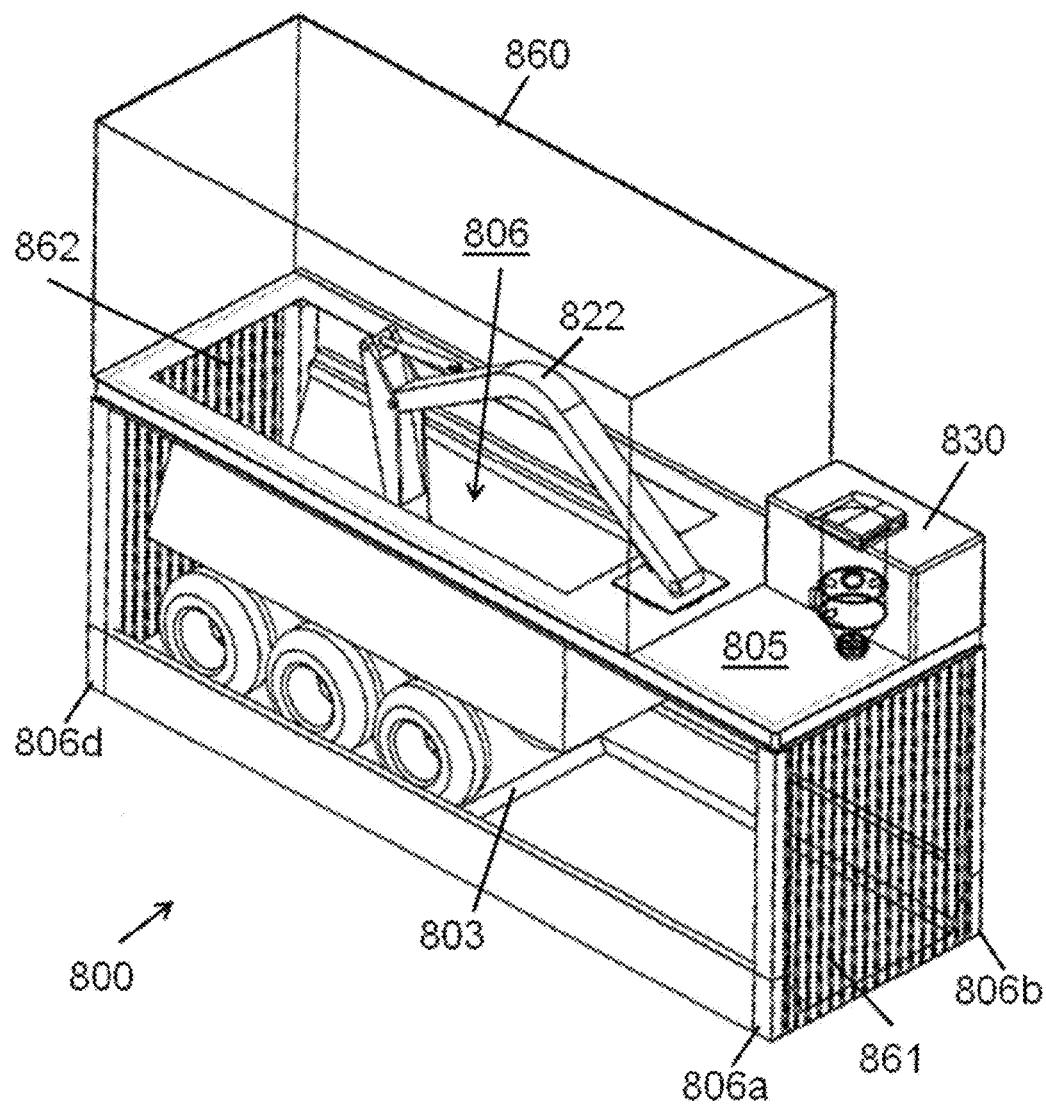
FIG. 11 shows the mixing system of FIG. 10 from a different viewing angle, showing a top and front side of the mixing system.
Figure 12:
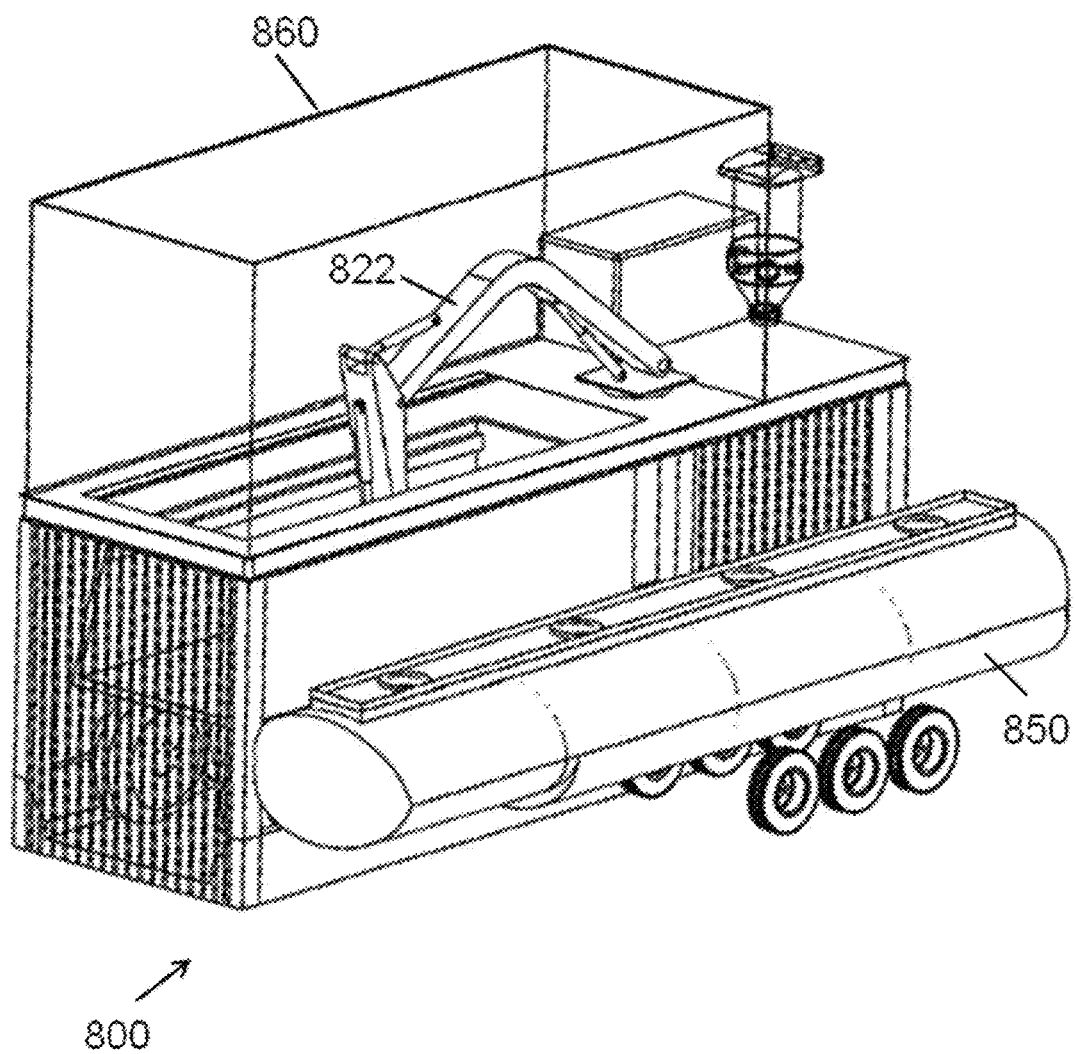
FIG. 12 shows the embodiment of FIG. 11, and in addition a bulk carrier located aside the platform.

FIG. 10 to FIG. 12 show embodiments of a mixing system 800 according to the present invention, whereby the platform 805 is located above, for example on top of the cargo body position area 801. This offers the advantage that less space is required, which advantage should not be underestimated when the mixing station 800 is installed in a city or on a construction site. The platform 805 may be supported by a plurality of supports 806, which are distanced with respect to each other such that envisioned cargo bodies 810 can be positioned under the platform 805 between the platform supports 806.

Everything which was mentioned above for the embodiment of FIG. 8 and FIG. 9 is also applicable for the embodiments of FIG. 10 to FIG. 13, except when explicitly mentioned otherwise.

In addition, preferably the mixing station of FIG. 10 to FIG. 12 further comprises an enclosure for preventing or limiting the amount of dust, caused by the mixing process, to escape to the surroundings of the mixing installation This is advantageous for the health condition of people in the vicinity of the mixing installation, and for the environment. As can be seen, the enclosure need not necessarily surround the entire installation, and parts of the system, for example the power and/or control unit 830 and one or more reservoirs 840 could be located outside of the enclosure. The enclosure is however not essential for the working of the mixing system, and may be omitted in situations where the dust is allowed to escape. In the embodiment of FIG. 10, the enclosure comprises a top construction 860, and a front cover or front shield or front door or front screen 861, and a back cover or back shield or back door or back screen 862, and side panels (not shown) positioned next to the cargo body position area 801. According to some embodiments of the present invention, the space where the cargo body is positioned, possible together with the mixing device and possible together with the moveable arm or the roller bridge, can be put in an—optionally sealed—space which can be put at an under pressure. The air that is pumped away from this space can pass a filter, e.g. a filter for dust.

Figure 13:
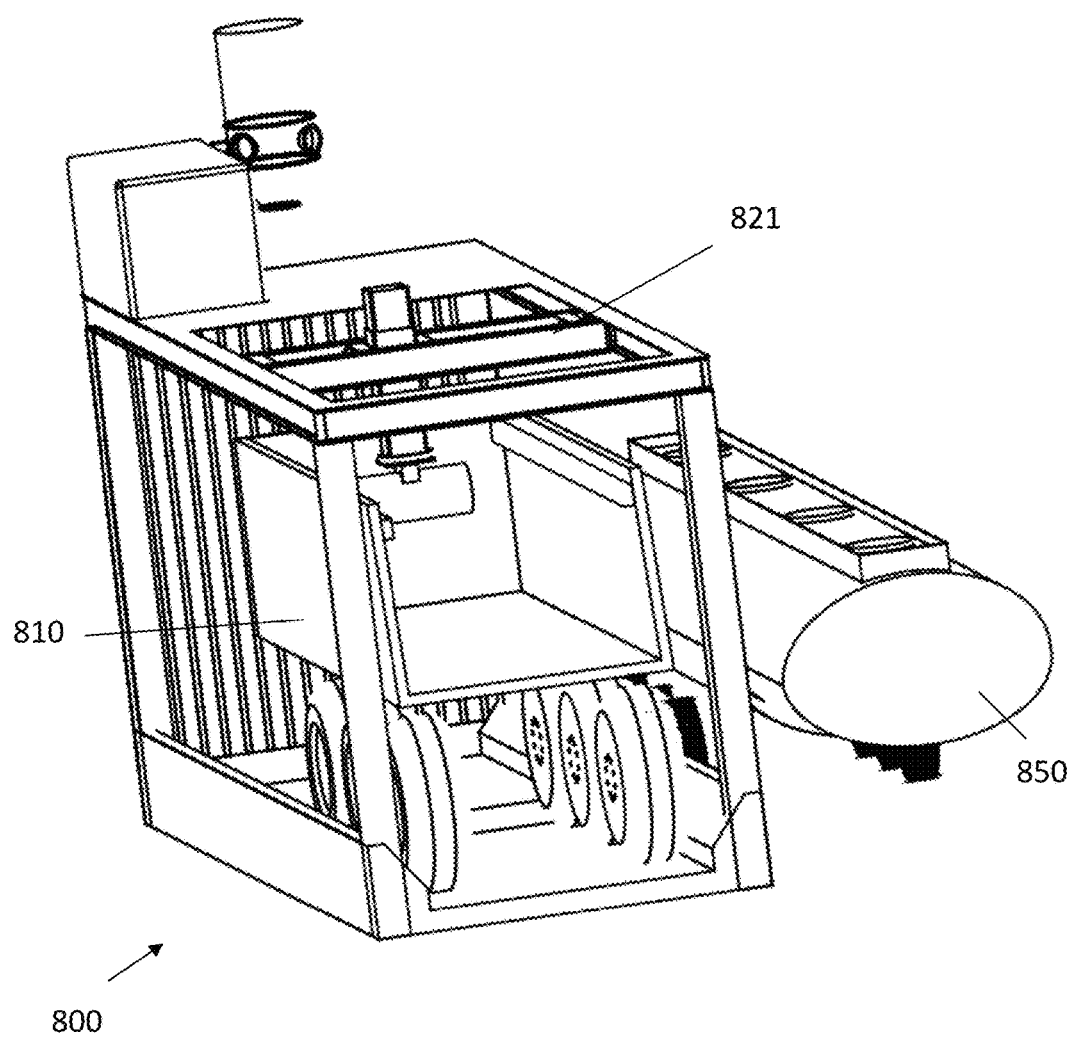
FIG. 13 shows a mixing system having a roller bridge instead of a movable arm, according to another embodiment of the present invention.

As mentioned above, instead of the moveable arm 822, a roller bridge could also be used. The latter is illustrated in FIG. 13 wherein the roller bridge 821 provides movement of the mixing device along the length and/or the width of the cargo body. Lowering of the mixing device can be performed by an arm or any other means allowing up/down movement of the mixing device.

FIG. 11 shows the mixing system 800 of FIG. 10 from another viewing angle.

FIG. 12 shows the embodiment of FIG. 11, and furthermore a bulk carrier located next to the platform. The bulk carrier could be used as a movable reservoir, as discussed in relation to FIG. 9, and could comprise one of the additives, for example quick lime, or water or cement, etc.

Embodiments of the mixing system may be transportable to a position at, on or near a construction site, not necessarily as a whole, but as a few building blocks, for example only two or three building blocks, for example in the example of FIG. 10, a first building block F, and a second building block E, but the invention is not limited thereto, and another partitioning may also be employed.

Figure 14:
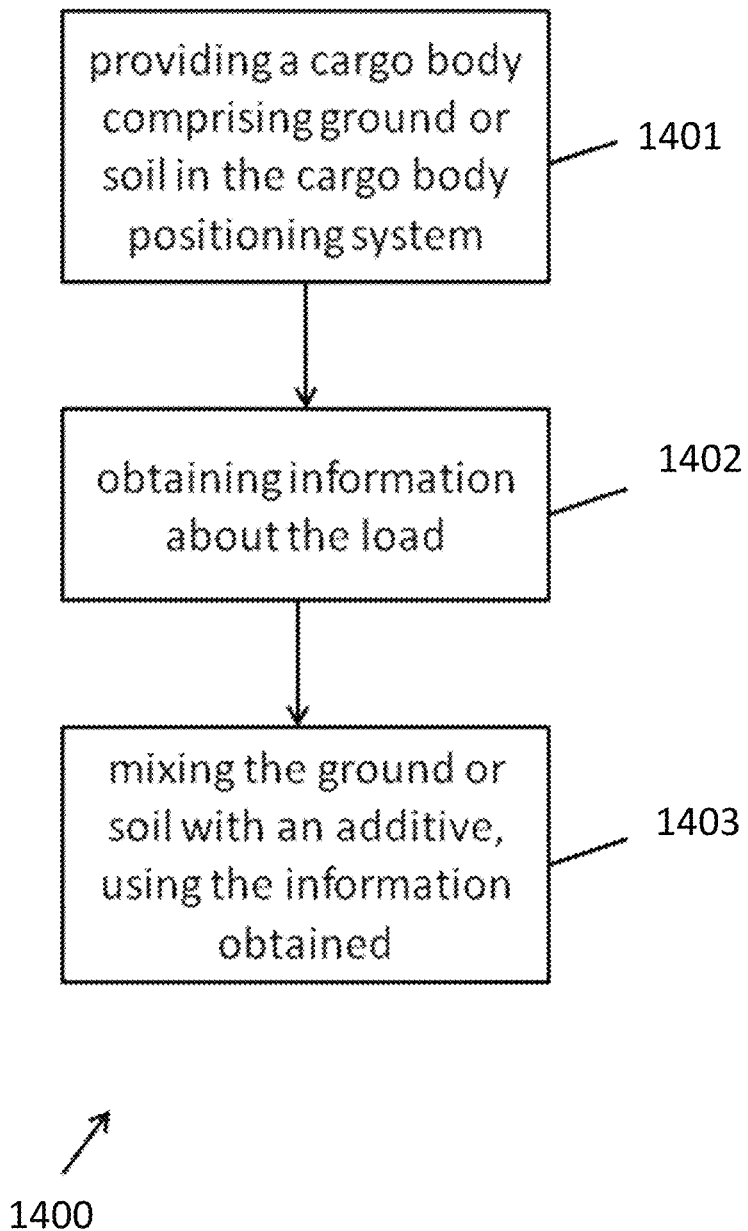
FIG. 14 illustrates a method according to the present invention.

In a second aspect, the present invention provides a method for treatment of ground of soil in a mixing system 800 described above with reference to FIG. 8 to FIG. 13. The method is illustrated in FIG. 14. In a first step 1401, a cargo body 810 containing a load of soil is provided in the cargo body positioning area 801. In a second step 1402, information is obtained about the load, using the information obtaining means. In a third step 1403, the soil present in the cargo body is mixed in the same cargo body with an additive, based on the information obtained by the information obtaining means, and by making use of the mixing device 820. It is noted that the additive may already be added on top of, or injected in the soil before arrival of the cargo body at the mixing station 800, or may be locally added or injected at the mixing station 800.

In a practical example, providing the cargo body could mean loading an amount of soil into a cargo body 810, and mounting an information carrier, such as an RFID tag or any other tag or a barcode or any other information carrier on the cargo body, and storing information about the loaded soil on or in the information carrier, and moving, e.g. driving the cargo body with the soil to a cargo body positioning area 801, of a mixing system 800 described above. The method may further comprise reading said information from the information carrier, and using said information for mixing the soil and/or for adding one or more amounts of one or more additives, and/or for calculating the required time for mixing, and/or the required speed with which the mixing device 820 can be moved through the soil in the cargo body.

After the mixing is finished, the cargo body 810 with the mixture can be transported to a construction site.

In a third aspect, the present invention relates to a mixing system 100 for mixing of soil with other soil and/or with one or more additives, for use with a transportation means. This makes it possible to transform soil, which was originally unsuitable for construction purposes, suitable for construction purposes.

Making grounds or soils suitable (for construction purposes) can be done by intensive mixing of the excavated soil with additives. In cohesive soil often mixtures of (quick) lime are used. Other possible additives are mixtures with cement. More generally, additives may be used which alter the humidity of the soil and/or which cause a (chemical) reaction with or in the soil.

The mixing system 100 comprises a mixing device 120 that can be mounted on a cargo body 110 such as the example illustrated in FIG. 1 to FIG. 6. In some embodiments of the present invention, the cargo body 110 is a container. In another embodiment, the cargo body 110 is a tipper body or an ejector body. In embodiments of the present invention, the cargo body 110 has on one side of the container one or more doors.

The mixing device 120 may comprise a reservoir 130 in which at least one additive can be stored. Optionally also several reservoirs 130 are possible. Alternatively, this reservoir 130 can be external, and may or may not be part of an embodiment of the present invention. The required volume of the reservoirs is dependent upon the amount of soil to be processed and the required concentration of the additive. In some embodiments of the present invention the volume of the cargo body 110 is between 5 and 15 $m^3$. In an exemplary embodiment of the present invention, the container 110 has a volume of 10 $m^3$, which, depending on the type of soil, corresponds to about 18 tons of soil. To improve certain soil types, typically 300 to 600 kg of additive (e.g. lime) may be required. Hence, in embodiments of the present invention, a reservoir 130 is needed that can hold a suitable amount of additive, for example 600 kg. Embodiments of the present embodiment allow the reservoir 130 to be filled in a smooth and dust-free manner. Dust filters may be provided, or the system may comprise closed compartments in which the air that is moved during the filling can circulate without exiting.

The mixing device 120 may comprise a metering device or a dosage device 220. Alternatively, such a dosage device may also be external to the mixing device, and thus not be part of an embodiment of the present invention. On the basis of the amount of soil—in at least some embodiments of the present invention, the amount of soil can be weighed by means of a weighing system—the necessary amount of additive(s) is determined. The required amount also depends on the composition of the soil, the moisture level of the soil and of the type of additive. The dosage device 220 ensures a uniform supply of the additive to the soil. In this way, a waste of additives is avoided. Such a dosage device 220 may be manually or automatically adjusted. The supply and mixing of the additive may also take place gradually and occur in different treatment cycles until the desired result is achieved.

The mixing device 120 comprises a mixing chamber 310. The additive is added by the dosage device 220 into the mixing chamber where the additive is mixed with the soil present therein.

In addition to the mixing device 120, the mixing system 100 comprises at least one closure for closing the mixing device, for example the mixing chamber. In a number of specific embodiments, the at least one closure comprises a first closure 140 that connects to the mixing apparatus 120 via a first connection mechanism 210, and a second closure 520 that connects to the mixing device 120 via a second connection mechanism 240.

The entire mixing system 100 is mountable on a cargo body 110. In embodiments, after mounting, the mixing device 120 is movable through the volume of the cargo body 110. In embodiments of the present invention this movement is a front to back movement within the cargo body, but it will be clear to the skilled person that mixing can also take place in the another direction or that the mixing can occur by moving the mixing device repeatedly a number of times through the volume of the cargo body. After assembly the dosage device 220 may be located, in this embodiment, above the cargo body and the mixing chamber 310 may be located within, or partially within the cargo body 110. In embodiments of the present invention, at least one closure of the cargo space ensures that no dust can escape to the environment, even during movement of the mixing device. It is also an advantage that the fully enclosed space makes treatment possible under fully controlled conditions.

In some embodiments, the charge reservoir may also be rigidly mounted on the driving or towed chassis, whereby the additive is conveyed in one way or another to the mixing device, for example, mechanically, hydraulically or pneumatically.

In some embodiments of the present invention, the cargo space 110 is closed by means of a first closure 140 at the front side of the mixing device 120 and by means of a second closure 520 at the rear side of the mixing device. The first closure 140 connects with the mixing device 120 via a first connection mechanism 210. The second closure 520 connects with the mixing device 120 via a second connection mechanism 240. In embodiments of the present invention, during a forward movement of the mixing device, the first closure 140 is folded/rolled up in the first connection mechanism 210, and the second closure 520 unfolds/unrolls from the second connection mechanism 240. Alternatively, a fixed closure may be foreseen, for example if the mixing installation would be located completely within the cargo body. Closures may be flexible or rigid, made from plastic (optionally even closing covers, but also rigid plastic panels) or may be made of metal. In another configuration, the reservoir 130 is permanently mounted on the moving or towed chassis (not on the side of the part 150 which can be opened), and the additive is fed to the mixing device 120. In this case, the mixing device 120 can be mounted entirely within the cargo body 110 and the closure 140 can be fixed, so that the closure does not need to follow the movements of the mixing device 120. FIG. 1 shows the situation in which the mixing device is located at a far side of the cargo body. Only the first closure 140 is visible. The second closure 520 unrolls or unfolds when the mixing device 120 moves from one side to the other side of the cargo body 110. When the mixing device 120 is located between the two sides of the cargo body 110, both the first and second closure 140, 520 are visible. In embodiments of the present invention the mixing system 100 closes the cargo body 110 completely. As a result dust due to the addition of the additive, is kept inside the cargo body 110 during the mixing. Since this dust formation occurs even when mixing so-called "low dust" or "dust-free" variants of additives (or aggregates), it is important that the mixing takes place in a closed or sealed cargo body 110. The fact that the cargo body 110 is closed has the additional advantage that the mixing process is environmental and weather independent.

In embodiments of the present invention, the additive is added in a dosed or metered manner to the soil while the mixing device 120 moves back and forth in one movement or in different movements through the cargo body. During this process, the soil and additive are mixed in the mixing chamber 310. The dosage or metering device 220 thereby ensures that the correct amount of additive is added at every position of the mixing device so that, ultimately, the desired concentration of additive is reached at any point in the soil mixture. Because the dosage device moves along with the mixing device, the additive is added directly into the mixing chamber 310. As a result, a homogeneous distribution of the additive is possible, which allows a reduced, e.g. minimal dosage of the additive for a desired, e.g. predefined guaranteed minimum concentration.

In other embodiments of the present invention, the additive may also be sprayed in a controlled manner into the mixing chamber, carried by air or water (pneumatic or hydraulic).

When different types of soil are available, they may be intensively mixed with one another and, of course, additional additives may also be added. By doing measurements during the mixing, the dose may be adjusted, optionally in different milling cycles, such that an optimal amount of additive is used. In practice, today sometimes an overdose of additives is being applied to be able to bring about the favourable result after treatment, in view of the potential heterogeneity (for instance in humidity and composition) of the excavated soil to be treated. With the present invention no overdose is required to guarantee delivery of the required quality.

Figure 5:
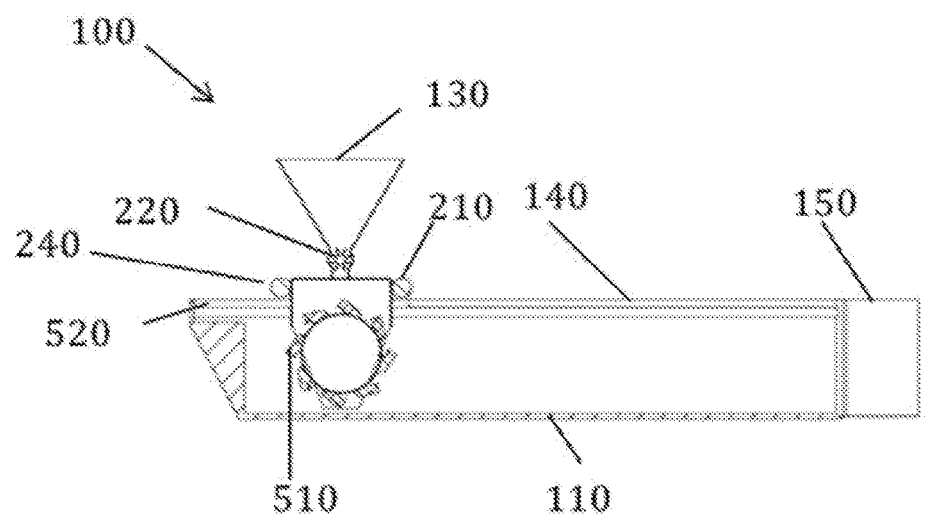
FIG. 5 illustrates a longitudinal cross section of a cargo body or container and mixing device wherein the mixing device comprises a mixing wheel or a clapper mixer, and wherein the mixing device is positioned at a distance from the extreme sides of the cargo body or container according to an embodiment of the present invention.
Figure 6:
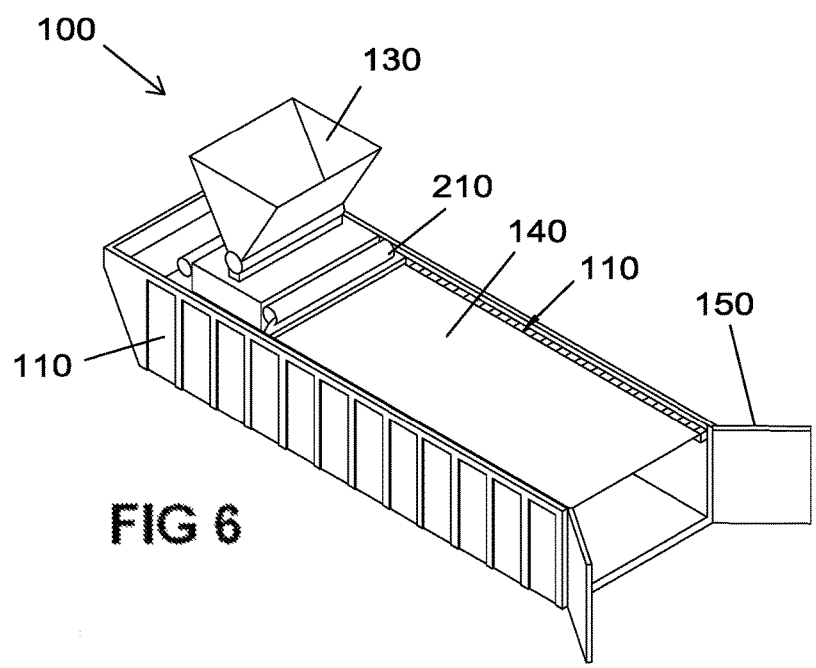
FIG. 6 is a 3D schematic overview of a cargo body or container with on top thereof a mixing device and a closure, whereby the mixing device is positioned at a distance from the extreme sides of the cargo body or container according to an embodiment of the present invention.

In embodiments of the present invention a mixing wheel 510 is present in the mixing chamber 310. Alternatively, there may also be two or more mixing wheels mounted, or one or more clappers or one or more shafts with cams, etc. The mixing element or the mixing elements, for example, the mixing wheel 510, provide(s) for breaking or crushing the soil and for turning over the soil into the mixing chamber for intensive mixing with an additive and/or for aeration. After mixing the ground falls down "behind" the mixing wheel 510. FIG. 5 shows a schematic representation of a possible embodiment of such a mixing wheel 510. In embodiments of the present invention, the mixing wheel 510 is composed of several teeth on a wheel. In embodiments of the present invention, the diameter of the wheel including the teeth is as large as the height of the soil in the container. The axis of the mixing wheel is oriented perpendicular to the side walls of the cargo body 110 and the mixing wheel 510 fits within the cargo body 110, whereby the width and the shape are selected such that also the soil present at the side of the cargo body is turned over during rotation of the mixing wheel 510. Various forms of mixing wheels and/or several mixing wheels are possible in embodiments of the present invention. The mixing chamber can be positioned such that the mixing element is located at the bottom, or in the middle, or at the top, or at the top and at the bottom, and further also in the plane of the mixing elements or behind them.

In embodiments of the present invention, the soil is not necessarily sieved or fragmented or crushed before the loading, Visual inspection provides the crane operator the possibility to select soil that is virtually free of stones and which is the most suitable for the application. Embodiments of the present invention are resistant to the occasional presence of stones and/or debris. In embodiments of the present invention the mixing device 120 moves "more cautiously" through the ground during a first pass than during the subsequent passages. In embodiments of the present invention sensors are mounted that measure the (mechanical) resistance exerted by the soil on the mixing element. At a too great resistance, the mixing device can then be slowed down or even be stopped. More cautiously may also mean that during the first passage, the mixing device moves more slowly than in the subsequent passages.

In embodiments of the present invention, it is the mixing device itself that crumbles and breaks the ground.

Figure 2:
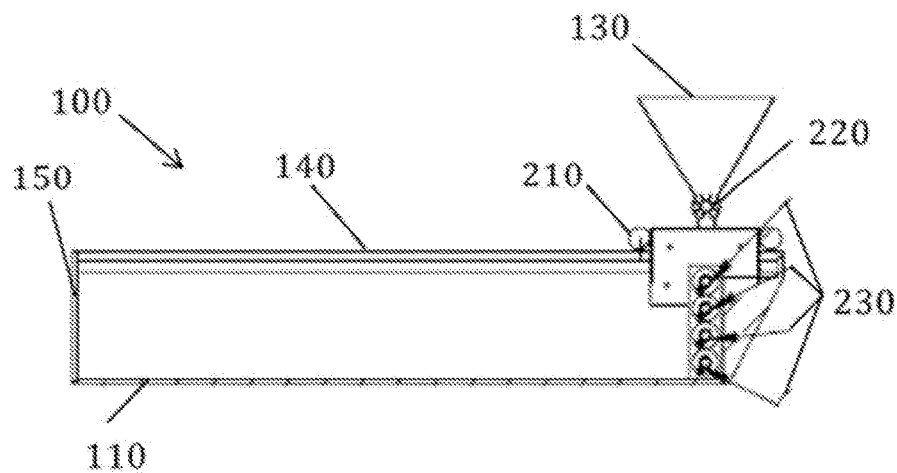
FIG. 2 illustrates a longitudinal cross section DD, as indicated in FIG. 1, of the cargo body or container and mixing device of FIG. 1 according to an embodiment of the present invention.
Figure 3:
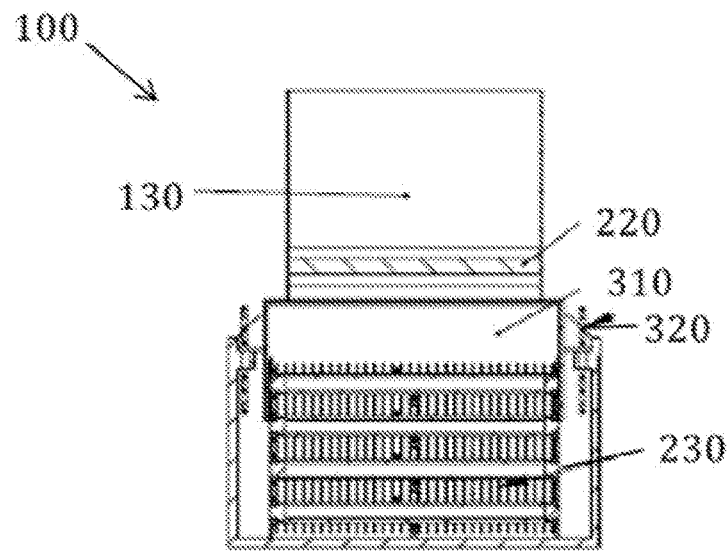
FIG. 3 illustrates a cross section CC, as indicated in FIG. 1, of a mixing device of FIG. 1 according to an embodiment of the present invention.
Figure 4:
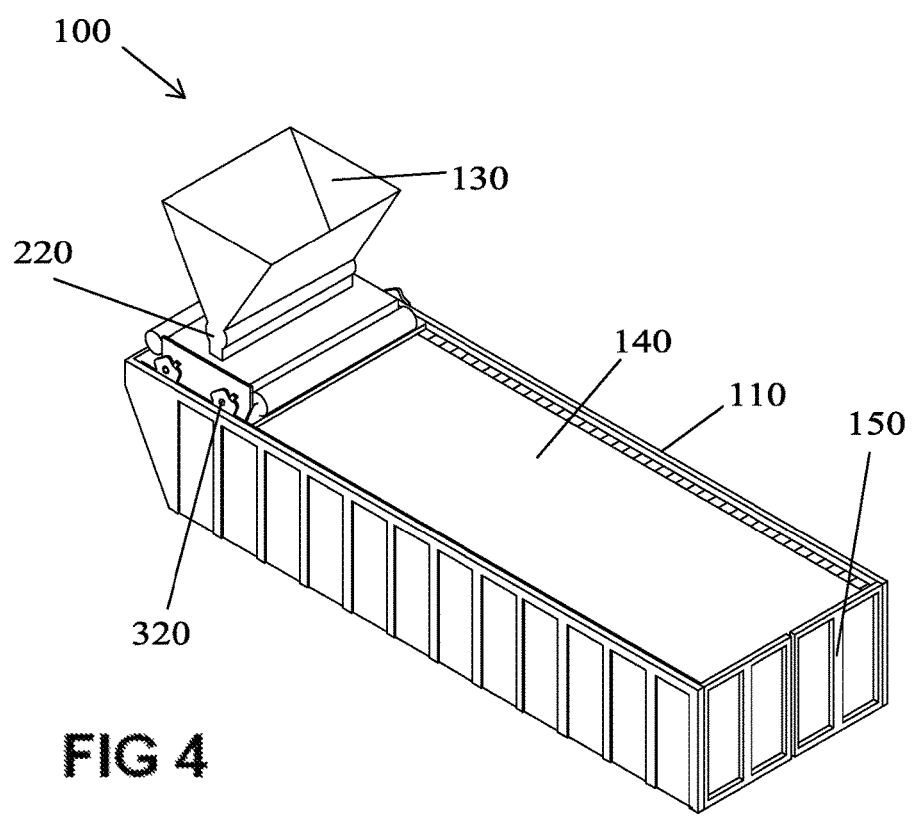
FIG. 4 is a 3D schematic overview of a cargo body or container on top of which a mixing device and a closure are mounted according to an embodiment of the present invention.

In the embodiment of FIG. 2 and FIG. 3 the mixing device 120 contains shafts with cams that also make it possible to sieve stones from the soil, and even to break them, optionally after rotation of the plane of the shafts. In embodiments of the present invention, the mixing device 120 thus contains shafts 230. These shafts 230 also allow to sieve larger chunks/stones from the soil, and even to break them. A rotation of the shafts also ensures that the cams turn over the ground, and thereby also break it down into smaller units, and feed them into the mixing chamber for intensive mixing with the additives. As stated above, also clappers or mixing wheels may be used for mixing.

In embodiments of the present invention, the mixing device 120 comprises one or more drive sprocket wheels 320. They ensure that the mixing device is capable of moving back and forth across the container. Optionally they also take care of the driving of the mixing wheel 510 and/or of the dosage or metering device 220 and/or of the axes 230.

In other embodiments of the present invention, the actuation may be wholly or partially hydraulic or wholly or partially based on chains. It is also possible that each of the shafts is driven by means of a separate chain.

The cargo body 110 may have different shapes and sizes, and depending on the application may be transported on a different transportation means. The cargo body can range from a semi-trailer, a container, dump or ejector body of a truck or agricultural vehicle, or any moving chassis, whether towed or driven, to railway wagons and even to the cargo hold of ships. In other embodiments the cargo bodies may be digging buckets, excavators, and/or bodies of conventional soil tillage machines such as cable cranes, hydraulic cranes or chargers.

By carrying out the loading in a competent manner 'lots' with the best properties for the end-use application can be selected. A quality loading can thus contribute to an efficient and qualitative process.

The bulk materials remain in the cargo bodies for varying lengths of time during transport. Making beneficial use of the transport time to treat a load with a known (and rather limited) volume may contribute to an efficient and high-quality process.

The cargo bodies may be closed or sealed in a suitable manner. In this way a space is created in which treatment of the loaded bulk materials can be carried out under strictly controlled conditions. By carrying out measurements of various relevant parameters, whether in a continuous manner or not, the treatment can be dynamically controlled and optimized to thereby contribute to an efficient and high-quality process.

By additionally doing registrations of the geographical location (using GPS) and the time of each loading, and by storing and processing this data, the follow-up of the totality of the loads can be managed, controlled and guaranteed, which ultimately leads to an efficient, verifiable and high-quality process.

The bulk materials can be of any kind; for construction applications it will mainly be mineral streams such as soil, sand, ground in all its appearances, fine and coarse aggregates, etc.

The transport means may be of any kind: towed or self-propelled, by ship or by axle, on tires or on caterpillar tracks, etc.

The treatments may be of any kind: mixing, keeping mixed, wetting, drying, sieving, crushing, etc., as long as the treated bulk materials meet the requirements for use in the envisioned industrial or construction application, on delivery.

In a fourth aspect, the present invention is related to a transport means, for example a truck or any moving chassis, whether driven or not, for conveying and mixing of soil. On the cargo body 110 of the truck a mixing system 100 is mounted. This allows to load in a first phase selected soil in the cargo body 110, then to mix it in a dust-free manner and to dose it with one or more additive(s), in order to finally deliver the treated soil for use in a construction application. The treated soil can be delivered to the same building site, to a nearby site or to a more remote site. The treated soil may also be delivered to a depot for later use. The soil may be mixed with an additive during the transport. The charge of the system equipped with the mixing container may also consist of soil or waste (for example, broken debris), which is not to be treated, and which is to be disposed outside of the building site or to a separate depot for final disposal or optionally further recycling. Embodiments of the present invention may be used to minimize as much as possible the supply and disposal of mineral flows in a flexible manner by recovering excavated soil and by making it suited. In this way, the complexity of the site logistics can also be reduced. Embodiments of the present invention are further applicable in various fields of application: civil engineering, environment, agriculture and industry.

In a specific application, the trucks or each moving chassis, whether driven or not, each being embodiments of the present invention, are employed in so-called line-shaped trajectories. Applied to sewerage works, the foundation, the envelop and the (back)filling of a sewer pipe may be performed in this way, with material that has been made suited. In these cases, usually only a limited working width is available, such as for example, in an existing street in an urban environment. In sewerage works the trajectory of the tube is systematically excavated (by means of an excavator crane), whereby the excavated soil layers are usually immediately loaded onto a transportation means. The excavated soil and the waste materials are either removed from the site or stored in a temporary storage space. If the present soil is suitable for (back)filling the sewer trench without additional treatment, then that soil is preferably to be reused right away. Embodiments of the present invention allow that cohesive soil is made suited on the spot of excavation. Embodiments of the present invention also allow to transport the soil, and to mix it with additives (to make it suited) during this transport. The excess materials may also be removed by the means of transport described above, but without treatment.

It is an advantage of embodiments of the present invention that the amount of additive can be adjusted according to the nature and the humidity of the soil that is effectively loaded in the means of transport. While the excavator crane excavates the sewerage trench in short lengths (corresponding to the length of the pipes), with or without trench shoring, the crane operator has the ability to distinguish the soil that is best suitable for reuse as a foundation, envelop or backfilling. It is an advantage of embodiments of the present invention that the portion of the excavated soil which is the least suitable for reuse may be disposed outside of the building site, optionally using the same means of transport that was equipped with the mixing installation, but whereby no treatment is performed during this transportation. The other portion of the excavated soil is made suited during the transport to the place of re-use or storage. The selection of the most suitable soil for treatment for the intended application can be judged by the experienced crane operator during the excavation and loading. By doing this, the action of loading itself acquires an additional added value. The most appropriate fractions are loaded on a truck on which a mixing system 100 in accordance with an embodiment of the present embodiment is mounted. It is an advantage of embodiments of the present invention that soil can be treated during, but also at the end of the transport phase, so that the treatment can take place in a controlled and confined cargo body. Embodiments of the present invention allow that soil loaded into a truck is made suitable for reuse as a foundation, envelop or backfilling of the trench by treating the soil during the transport from the origin (loading point) to the destination (unloading point). The origin and the destination may be located closely together. In the latter case, the truck or the moving chassis, whether driven or not, being an embodiment of the present invention, moves from the origin (e.g. excavation site) to the destination (e.g. construction site), while the ground is being made suitable, and optionally is mixed with an additive. It is an advantage of embodiments of the present invention that, depending on the quality of the loaded soil, the required amount of additive can be determined. Moreover, no dust is released while mixing.

At present, loading carts, trucks and trailers are used to transport the soil and the debris. Typically they have a useful loading capacity of 5 to 15 m$^3$. It is an advantage of embodiments of the present invention that mixing systems 100 can be added to existing carts, trucks or semi-trailers. This add ons may be permanent or removable. In embodiments of the present invention, the mixing system 100 comprises a reservoir 130 for holding one or more additives, a dosing device 220, and a mixing device 120 (or, but not limited to 510). In embodiments of the present invention, the truck or the loading body comprises additional measuring devices and sensors such as, for example, weighing sensors. These sensors may be used to weigh the contents of the cargo body, but also that of the reservoir 130. The mixing system 100 comprises, in some embodiments of the present invention, a humidity sensor for measuring the humidity of the soil to be treated.

In embodiments of the present invention, the mixing device 120 (or, but not limited to 510) moves back and forth through the soil in the cargo body 110 in one or more passes, while the cargo space remains completely closed. The operations continue until the soil is made sufficiently suitable. Ideally this should be performed in a duration shorter than the normal time needed to travel from the loading point (excavation) to the unloading point. It is an advantage of embodiments of the present invention that the limited quantity of soil to be mixed makes it possible to realize the mixing in the limited time. Often the time needed to transport the soil from the loading point to the unloading point is sufficient for complete treatment of the soil. In embodiments of the present invention, the mixing time can be limited to a value in the range of 5 to 15 minutes.

In embodiments of the present invention, the transport means and/or the mixing device comprise(s) a weighing system for weighing the contents of the cargo body and/or comprise(s) a GPS system for determining the position of the truck.

In embodiments of the present invention the weight and/or the moisture content of the loaded soil to be treated can be measured automatically. Based on these measurements the quantity and optionally also the nature of the additive to be added, can be determined. The required amount of additive can be added by using a dosage device 220. In embodiments of the present invention, optionally also the number of required passes can be determined, on the basis of the measurements. Optionally, the amount of required additive and the required number of passes may be changed during the mixing, based on measurements taken during the mixing process. In embodiments of the present invention, the compactibility of the soil (whether wholly or partially treated or not) can be measured, so that a continuation, adjustment or termination of the mixing process can be determined. In embodiments of the present invention monitoring also makes it possible to adapt the mixing process in function of the expected transport time. For example, by increasing or decreasing the transit time of the mixing device 120 or by accelerating or decelerating the flow of additives. If there is enough time it is furthermore possible to aerate and ventilate in a controlled manner to achieve a drying effect. In embodiments of the present invention for the latter purpose use can be made of the residual heat of the engine of the drive system. In embodiments of the present invention, the soil may also be additionally humidified, if required. On the basis of measurements with a humidity sensor, the desired moisture content can be realized.

In embodiments of the present invention it is also possible to add soil types or other mineral substances of natural or artificial origin for improving the original soil. If mixing with cement would be desired, the load can be prepared intensively during transportation, and a correct dose of cement and water—according to the desired application, such as for the preparation of cement-sand or lean concrete—may for example be added shortly or immediately before unloading.

In embodiments of the present invention a storage unit and/or a processing unit is provided for processing and/or storing the data. Also, a wireless transmitter may be present in order to be wirelessly connected to a remote data storage and/or processing unit. In this way, for example, the weight of the truck, as well as the position of the truck, can be recorded as a function of the time. Optionally, a sensor is provided for measuring the humidity of the soil. This humidity can be a parameter to determine the required amount of additive. The added amount of additive and humidity of the soil may also be added in the database. Measurement data from other sensors may also be added to a database. Thus, such a database provides a way to increase the traceability of soil and additives. It allows quality control and moreover allows to prevent abuses. It is indeed possible to trace where certain fractions were dumped. Thus, it constitutes an overall system for assuring the quality and use.

In embodiments of the present invention each ride can be assigned a unique reference where all possible data can be linked to. In case a location positioning system, such as for example a GPS system is present, the location of excavation among others, can be recorded, as well as the location of each additional loading, and the location of the unloading (site of reuse) of the material made suitable.

The presence of a storage medium makes logging possible, so that all useful data per trip can be stored. The information may optionally also be sent wirelessly. The transmitted information may optionally be monitored by a supervisor or may even be continuously monitored by a computer. This can be performed per trip, per part of the job, per day, per week, and so on.

The mixing system 100, along with the necessary registration systems may also be designed to be mounted on a cargo body of a conventional machine for soil treatment. Such machine may for example be a crane or a backhoe loader. The classic machine is thereby extended by installing a mixing system 100 on the cargo body 110. The volume of the cargo body in this case, is typically between 1 and 3 m³.

Figure 7:
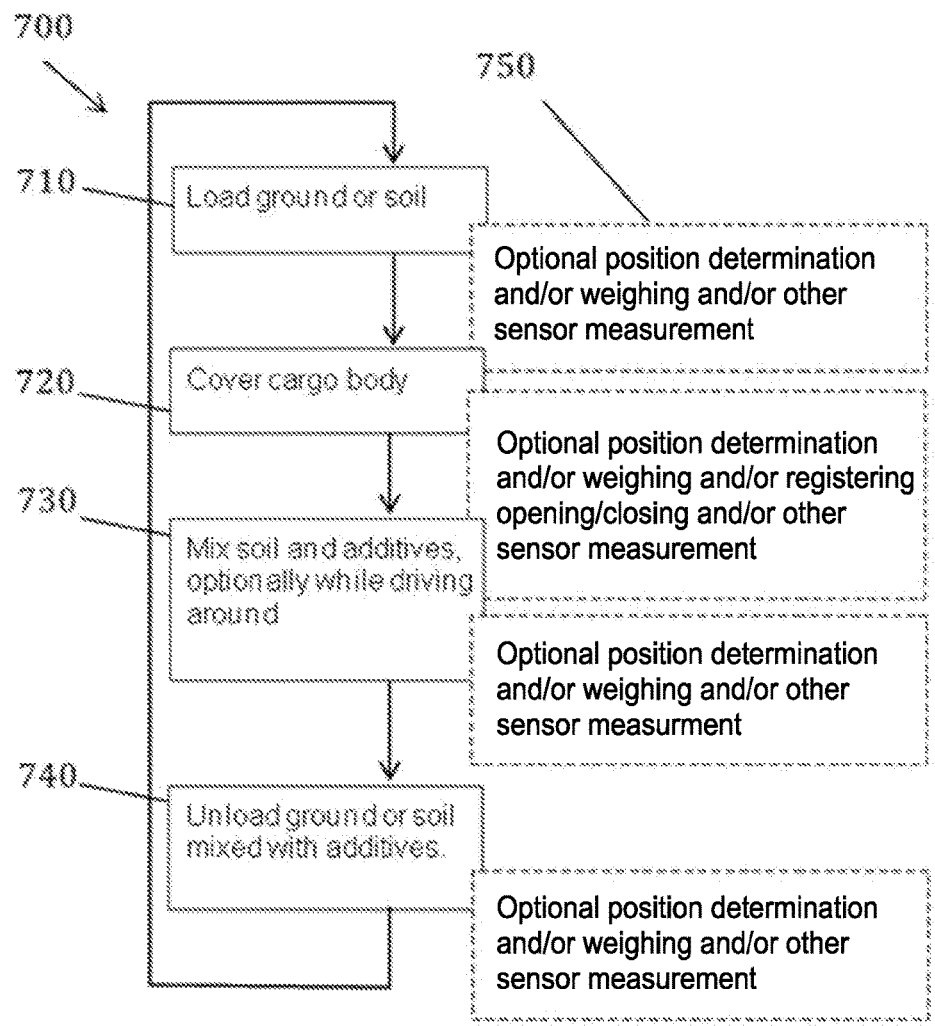
FIG. 7 illustrates the various steps of a method according to an embodiment of the present invention.

In a fifth aspect, illustrated in FIG. 7, the present invention relates to a method 700 for processing of soil. It may concern for example, soil from excavations, of road works or sewerage works, and also improvement or decontamination works.

A first step 710 relates to loading of soil in a cargo body 110.

A second step 720 relates to closure of the cargo body 110 in order to create an enclosed cargo space, so that no dust can escape to the surroundings, during the transportation, the processing and/or the mixing of the soil with the additive. For this purpose, the cargo body is covered/closed, in the second step 720, with at least one closure, for example a first closure 140, and optionally subsequently also with a second closure 520. The first closure 140 connects to a first side of the mixing device 120. The second closure 520 connects to a second side of the mixing device 120. As an alternative there may also be a single permanent closure, if this is so conceived. The connection of the closures 140, 520 with the mixing device 120 is achieved by means of a first and a second connection mechanism 210, 240.

A third step 730 relates to the mixing of the soil and the additive by the back and forth movement of the mixing device 120 through the soil. During the back and forth movement of the mixing device 120 through the soil, the at least one closure always forms a cover of the cargo body so that dust formation in the environment can be avoided, and a closed cargo space is created.

During the third step 730 an additive is added to the soil in the mixing chamber 310 where the soil and the additive are mixed with each other. Because the cargo body 110 is completely closed (or sealed) by the closure and the mixing system 100, no dust formation will arise outside the cargo body during the mixing. Moreover, the closure also ensures that the mixing can be performed in a weather-independent manner. The cargo body 110 may be mounted on a truck or on a moving chassis, whether driven or not, which may move during the mixing.

A fourth step 740 relates to the unloading of the soil mixed with additive.

In embodiments of the present invention optionally to each or some of the foregoing steps 710, 720, 730, 740, an additional fifth step 750 may be added. This step 750 relates to position determination and/or to weighing of the contents of the container 110 and/or of a reservoir 130 and/or the measurement of other relevant parameters using other sensors (e.g. humidity, electrical resistance, compactibility). By the position determination it is possible to know the origin and destination of the soil. By also storing the dosage information of the additive, it is also possible to document, to control and to trace the treatment received by the soil, and the concentrations of additives that were actually realised. By weighing the soil, the total quantity of additive(s) required can be estimated. By traceability of the origin, destination and composition (treatment) of the soil, quality control is possible. Traceability also allows to take measures to prevent illegal dumping. Embodiments of the present invention make it possible to trace the use and consumption of additives. Continuously measuring using the sensors also makes it possible to adjust the mixing process during mixing and to optimize the use of additives.

As indicated above, there may also be a sieving step and a breaking and/or crushing step. In one specific example, this may occur before the mixing.

The various aspects can be easily combined with each other, and the combinations thus also correspond to embodiments of the present invention.

Optionally, one or more additional steps may also be provided for unloading the soil. A first possible step that can be provided is the aeration of the grounds or soils, whether after or before treatment with an additive or not. By aerating the mixed material, for example by turning over the soil and by providing a pass of dry air, drying of the soil can be stimulated. The drying air may, in turn, be dried by making use, for example, of the residual heat of the engine of the vehicle. In addition, the reaction between cohesive soil and (quick) lime is exothermic. In combination with aeration, this may accelerate an optional drying process.

Optionally, after a first treatment of the soil also a second treatment may occur, such as mixing with cement. Besides obtaining improvement of the compactibility, this can ensure fast resistance of the material after being compacted. By doing this in a separate step, the mixing with cement, can for example be performed under better controllable conditions, so that the various processes can be executed in an improved manner.

The invention claimed is:

1. A mixing system for mixing soil with an additive in a batch mode, the mixing system comprising:
    a moveable mixing device for mixing the soil with an additive, and a moving mechanism for moving said mixing device;
    a cargo body positioning area for receiving a cargo body containing a load of soil;
    the cargo body positioning area and the moving mechanism being configured in position such that the mixing device can be positioned at least partly in the soil through an open side of the cargo body in said cargo body for mixing the soil with the additive;
    the mixing system furthermore comprising an information obtaining system configured for, when the cargo body containing the load of soil is positioned in the cargo body positioning area, automatically obtaining information regarding at least one characteristic of the load of the cargo body and information regarding the cargo body so as to allow the mixing system to mix the soil with the additive, taking into account said information regarding at least one characteristic of the load of the cargo body, wherein the information obtaining system is configured for obtaining information about the inner dimensions of the cargo body and wherein the system comprises a control unit for controlling the moving mechanism based on at least the information about the inner dimensions of the cargo body such that it is moved substantially through the entire space defined by the cargo body.

2. A mixing system according to claim 1, wherein the moving mechanism comprises a moveable arm or a roller bridge.

3. A mixing system according to claim 1, further comprising a platform positioned at a platform height with respect to a ground level, the platform height being chosen such that an upper open side of the cargo body, when the cargo body is positioned at the ground level, is positioned below the platform height, whereby the moving mechanism is mounted to the platform.

4. A mixing system according to claim 3, wherein the mixing system comprises platform supports for supporting the platform with respect to the ground level, wherein the platform supports are distanced with respect to each other such that a cargo body can be positioned under the platform between the platform supports and/or wherein the platform and the moving mechanism are configured so as to allow mixing in a cargo body when the cargo body is positioned aside the platform.

5. A mixing system according to claim 4, wherein the mixing system furthermore comprises a ramp or rampart or quay providing a transition between the ground level and an elevation, the platform being positioned on said elevation, said platform and said ramp or rampart or quay being configured such that mixing in a cargo body positioned at ground level adjacent the ramp or rampart or quay can be performed.

6. A mixing system according to claim 1, wherein the mixing system is moveable so that it can be moved to a position near a construction site and/or wherein the mixing system further comprises a dosage device or metering device configured for dosing or metering at least one additive to be added to the soil in the cargo body.

7. A mixing system according to claim 6, wherein the mixing system furthermore comprises a local reservoir or wherein the mixing system comprises a feeding tube from an external reservoir.

8. A mixing system according to claim 1, wherein the mixing system furthermore comprises a closure on a part of the mixing system comprising the cargo body for shielding the environment from dust caused by the mixing in the cargo body.

9. A mixing system according to claim 1, wherein the mixing device comprises one or more mixing wheels and/or one or more milling wheels and/or one or more axles and/or one or more clappers and/or wherein the mixing device comprises axles containing cams, for, inter alia, a sieving operation and/or wherein the mixing device comprises a drive sprocket wheel and/or a hydraulic drive and/or a drive chain.

10. A mixing system according to claim 1, further comprising a sensor for receiving information regarding the load in the cargo body, for controlling a dosing device and/or the mixing device; the sensor being in communication with the information obtaining system.

11. A mixing system according to claim 10, wherein the sensor is adapted for reading load information or information about the cargo body from a tag.

12. A mixing system according to claim 1, wherein the mixing system further comprises a weighing device positioned substantially at ground level below or aside the platform, for obtaining a weight of the cargo body or its load; the weighing device being in communication with the information obtaining system.

13. A mixing system according to claim 1, wherein the system comprises a sensor configured for detecting a resistivity of the soil, or for detecting a humidity of the soil, or for detecting a compactibility of the soil, or a combination hereof and/or wherein the system is configured for determining the position of the cargo body; the sensor configured for detecting a resistivity of the soil being in communication with the information obtaining system.

14. A mixing system according to claim 1, wherein the system furthermore is configured for registering the origin, processing and the destination of the soil for allowing traceability of the soil and/or wherein the system is configured for determining the position of the cargo body.

15. A method for treatment of ground of soil in a mixing system comprising a moveable mixing device, and a moving mechanism, and a cargo body positioning area for receiving a cargo body containing a load of soil, and information obtaining system for obtaining information about at least one characteristic of the load inside the cargo body and information regarding the cargo body, the method comprising the steps of:
providing a cargo body containing a load of soil in the cargo body positioning area;
obtaining information about at least one characteristic of the load and information regarding the cargo body using the information obtaining system;
mixing the soil in the cargo body with an additive, based on the information obtained, and using the mixing device,
wherein obtaining information comprises obtaining information about the inner dimensions of the cargo body and wherein mixing comprises mixing such that a mixing device is moved substantially through the entire space defined by the cargo body.

16. A method according to claim 15,
wherein providing a cargo body containing a load of soil comprises loading a load of soil into a cargo body, and transporting said cargo body to the mixing system.

17. A method according to claim 15, wherein the cargo body is a trailer.

18. A method according to claim 15, further comprising the step:
transporting the cargo body containing the soil mixed with the additive to a construction site,
and/or further comprising the step of
lowering the movable mixing device in the cargo body directly below or aside the platform and/or wherein the mixing system further comprises a control unit, and the method further comprises the step of
reading in, in the control unit of the mixing system, the information regarding the load of the cargo body, and determining based on the obtained information, information regarding the additive to be added or the mixing to be performed.

19. A method according to claim 18, wherein reading in information comprises one or more of the following: reading in information from a tag on the cargo body, reading in information from a weighing device of the mixing system, reading in information of a sensor for detecting a ground resistivity, reading in information of a sensor for detecting humidity of the soil or compactibility of the soil.

20. A method for treatment of ground of soil in a mixing system comprising a moveable mixing device, and moving mechanism, and a cargo body positioning area for receiving a cargo body containing a load of soil, and information obtaining system for obtaining information about at least one characteristic of the load inside the cargo body, the method comprising the steps of:
providing a cargo body containing a load of soil in the cargo body positioning area;
obtaining information about at least one characteristic of the load using the information obtaining system;
mixing the soil in the cargo body with an additive, based on the information obtained, and using the mixing device,
wherein the mixing system further comprises a platform positioned at a predefined height above the ground, the moving mechanism being mounted to said platform, and whereby providing the cargo body further comprises positioning the cargo body on the cargo body positioning area located underneath or aside the platform, wherein obtaining information comprises obtaining information about the inner dimensions of the cargo body and in that mixing the soil in the cargo body comprises mixing through the entire space defined by the cargo body.

\* \* \* \* \*